(12) United States Patent
Watada

(10) Patent No.: US 11,635,582 B2
(45) Date of Patent: Apr. 25, 2023

(54) MICROSCOPE APPARATUS AND PROGRAM

(71) Applicant: FUJIFILM Corporation, Tokyo (JP)

(72) Inventor: Yusuke Watada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 166 days.

(21) Appl. No.: 16/860,213

(22) Filed: Apr. 28, 2020

(65) Prior Publication Data

US 2020/0257074 A1   Aug. 13, 2020

Related U.S. Application Data

(63) Continuation of application No. PCT/JP2018/038979, filed on Oct. 19, 2018.

(30) Foreign Application Priority Data

Nov. 15, 2017   (JP) .............................. JP2017-220179

(51) Int. Cl.
| | | |
|---|---|---|
| G02B 21/00 | (2006.01) | |
| G02B 7/04 | (2021.01) | |
| G02B 7/28 | (2021.01) | |
| G02B 21/02 | (2006.01) | |
| G02B 21/36 | (2006.01) | |

(52) U.S. Cl.
CPC ............... *G02B 7/04* (2013.01); *G02B 7/282* (2013.01); *G02B 21/025* (2013.01); *G02B 21/36* (2013.01)

(58) Field of Classification Search
CPC .. G02B 21/00; G02B 21/002; G02B 21/0036; G02B 21/0052; G02B 21/006; G02B 21/008; G02B 21/02; G02B 21/025; G02B 21/24; G02B 21/241; G02B 21/242; G02B 21/36; G02B 7/04; G02B 7/09; G02B 7/102; G02B 7/28; G02B 7/282
USPC .................................................. 359/368–398
See application file for complete search history.

(56) References Cited

U.S. PATENT DOCUMENTS

| | | | | |
|---|---|---|---|---|
| 5,483,055 A | * | 1/1996 | Thompson | ........... G02B 21/006 |
| | | | | 250/201.3 |
| 2006/0001954 A1 | * | 1/2006 | Wahl | .................... G02B 21/086 |
| | | | | 359/368 |

FOREIGN PATENT DOCUMENTS

| | | |
|---|---|---|
| DE | 102005032354 A1 | 1/2007 |
| JP | 10-232342 A | 9/1998 |
| JP | 2003-294419 A | 10/2003 |
| JP | 2003-295065 A | 10/2003 |
| JP | 2006-215259 A | 8/2006 |
| JP | 2007-218846 A | 8/2007 |

(Continued)

OTHER PUBLICATIONS

Machine English translation of the Germany referecne No. DE 10 2005 032 354 published on Nov. 1, 2007.*

(Continued)

*Primary Examiner* — Thong Q Nguyen
(74) *Attorney, Agent, or Firm* — Birch, Stewart, Kolasch & Birch, LLP

(57) ABSTRACT

In a case where a microscope apparatus main body scans the bottom surface of the cultivation container by synchronously controlling a piezoelectric element and an actuator serving as optical axis-directional transport devices having different properties from each other, an objective lens of the imaging optical system is transported to a focus position in the optical axis direction.

11 Claims, 17 Drawing Sheets

(56) References Cited

FOREIGN PATENT DOCUMENTS

| JP | 2010-72017 A | 4/2010 |
| JP | 2011-81211 A | 4/2011 |
| WO | WO 91/06911 A1 | 5/1991 |

OTHER PUBLICATIONS

International Preliminary Report on Patentability, dated May 28, 2020, and English translation of the Written Opinion of the International Searching Authority, dated Jan. 22, 2019, (Forms PCT/IB/326, PCT/IB/373, and PCT/ISA/237) for International Application No. PCT/JP2018/038979.
International Search Report (Form PCT/ISA/210) for International Application No. PCT/JP2018/038979, dated Jan. 22, 2019, with English translation.
Extended European Search Report, dated Dec. 7, 2020, for corresponding European Application No. 18877851.8.
European Communication pursuant to Article 94(3) EPC for corresponding European Application No. 18877851.8, dated Jan. 3, 2023.

* cited by examiner

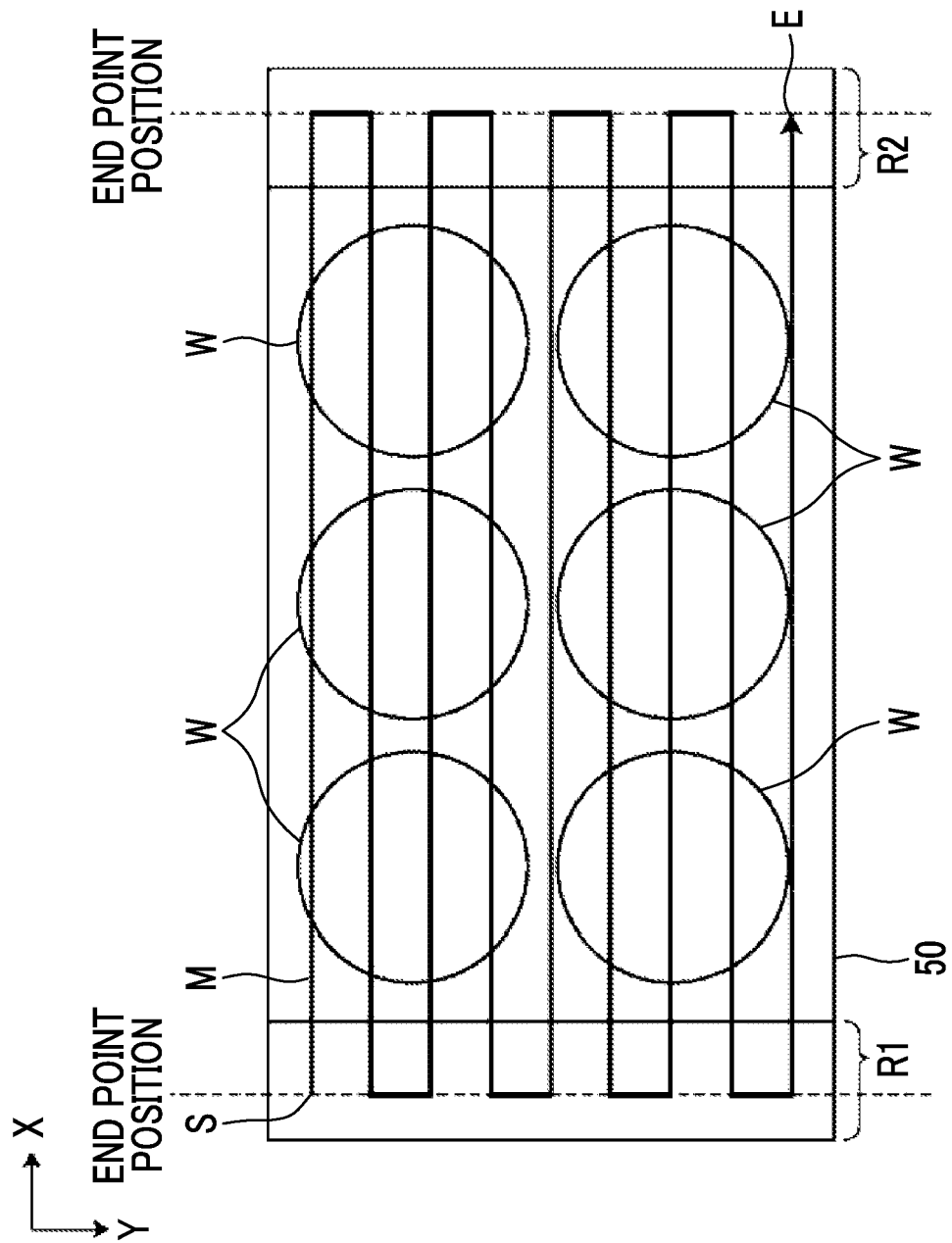

| DISPLACEMENT AMOUNT IN Z DIRECTION | VOLTAGE |
|---|---|
| Z1 | V1 |
| Z2 | V2 |
| Z3 | V3 |
| Z4 | V4 |
| ⋮ | ⋮ |

MICROSCOPE APPARATUS AND PROGRAM

CROSS-REFERENCE TO RELATED APPLICATIONS

This application is a Continuation of PCT International Application No. PCT/JP2018/038979 filed on Oct. 19, 2018, which claims priority under 35 U.S.C § 119(a) to Japanese Patent Application No. 2017-220179 filed on Nov. 15, 2017. Each of the above application(s) is hereby expressly incorporated by reference, in its entirety, into the present application.

BACKGROUND OF THE INVENTION

1. Field of the Invention

The technology of the present disclosure relates to a microscope apparatus and a program.

2. Description of the Related Art

In the related art, a method for capturing an image of a multipotential stem cell such as an embryonic stem (ES) cell or an induced pluripotent stem (iPS) cell, a differentiated and induced cell, or the like using a microscope or the like, and capturing a feature of the image to decide a differentiation state of the cell, or the like has been proposed.

The multipotential stem cell such as an ES cell or an iPS cell is able to be differentiated into cells of various tissues, and may be applied to regenerative medicine, development of medicines, explanation of diseases, or the like.

On the other hand, a high-magnification image can be obtained by imaging using a microscope, but an observation region of an imaging optical system of the microscope is limited to a narrow range. Therefore, in order to obtain a high-magnification and wide view image of an observation target, it has been proposed to perform a so-called tiling imaging. Tiling imaging is an imaging method for capturing a plurality of narrow view images and connecting the captured narrow view images to generate a wide view image. Specifically, it is possible to generate a wide view image including an entire observation target by scanning an entire observation target by two-dimensionally moving the imaging optical system of the microscope and a stage on which a cultivation container such as a well plate containing the observation target is installed relative to each other, and connecting the images obtained for each of the observation region.

SUMMARY OF THE INVENTION

In a case of performing the tiling imaging as described above, a focal position of the imaging optical system is often set with reference to a bottom surface of the cultivation container.

However, there is a millimeter-order fabrication tolerance in a thickness of the bottom of the cultivation container. Moreover, in a case of performing high-magnification imaging, it is not possible to ignore variations in the bottom surface of the cultivation container due to this fabrication error. In other words, in a case of performing high-magnification imaging, it is not possible to assume that the thickness of the bottom of the cultivation container is uniform with respect to each observation region in tiling imaging, and it is necessary to measure the focal position for each observation region, and move the imaging optical system to the focus position in an optical axis direction for each observation region. Therefore, it is necessary to move the imaging optical system of the microscope and the stage on which the cultivation container is installed relative to each other in a three-dimensional manner.

In order to move an objective lens of the imaging optical system to a focus position in an optical axis direction for each observation region with respect to variations in the bottom surface of the cultivation container in a case of scanning the cultivation container at high speed using the imaging optical system of the microscope, a mechanism of moving in a vertical direction at a high speed is preferable. Therefore, a piezoelectric element is used as an optical axis direction moving member.

On the other hand, a drivable range of the piezoelectric element is limited. Therefore, the objective lens of the imaging optical system cannot be moved in the optical axis direction beyond an upper limit at which the piezoelectric element may be deformed. Thus, in a case where there are large variations on the bottom surface of the cultivation container, an optical axis direction moving mechanism using only the piezoelectric element cannot perform an appropriate auto-focus control.

The microscope apparatus of JP2011-081211A comprises a vertical driving unit including a stepping motor and a piezo element. However, JP2011-081211A does not disclose at all how to use the stepping motor and the piezo element in driving the objective lens in the vertical direction.

With the technology according to JP2011-081211A, in a case where there are large variations in the bottom surface of the cultivation container, it is difficult to perform an auto-focus control so that follow the horizontal movement of the imaging optical system.

In view of the above-described problem, the technology of the present disclosure provides a microscope apparatus and a program capable of performing a focus control so as to follow the position of each region in the optical axis direction according to a scanning situation.

According to a first aspect of the present disclosure, there is provided a microscope apparatus comprising: an imaging optical system capable of forming an image of observation target light indicating an observation target in a container in which the observation target is contained, on an imaging element; a drive source that includes a first moving member movable along an optical axis direction of the imaging optical system, and a second moving member movable in the optical axis direction in a range wider than that of the first moving member and moves the imaging optical system in the optical axis direction using the first moving member and the second moving member; and a controller that controls the drive source to cause the imaging element to form the image of the observation target light in a focus state when the optical axis reaches a specific region, by moving the imaging optical system in the optical axis direction by using the first moving member and the second moving member based on information on a distance in the optical axis direction between the specific region and a region to be imaged by the imaging element at an imaging position, in a case where it is determined that the specific region exists at a position of an out-of-focus state in a state where the first moving member is moved to a limit of a movable range of the first moving member before the optical axis reaches the specific region among respective regions, in a state where the imaging element scans the respective regions in the container by moving the imaging optical system with respect to the respective regions in the container by a movement of at least one of a stage on which the container is installed or the imaging optical system in a plane intersecting the optical axis direction.

According to a second aspect of the present disclosure, in the first aspect, in the microscope apparatus, an amount of power in the optical axis direction distributed by the first moving member and the second moving member is determined in accordance with a relationship between the information on the distance, information on a position of the second moving member in the optical axis direction before the specific region is scanned, and information on a moving amount of the first moving member.

According to a third aspect of the present disclosure, in the first or second aspect, in the microscope apparatus, the controller controls the drive source to cause the imaging element to form the image of the observation target light in the focus state when the optical axis reaches the specific region by applying the power in the optical axis direction by only the first moving member out of the first moving member and the second moving member to the imaging optical system based on the information on the distance, in a case where it is determined that the specific region exists at a position of the focus state in a state where the first moving member is moved below the limit of the movable range, before the optical axis reaches the specific region among the respective regions in a state where the imaging element scans the respective regions in the container.

According to a fourth aspect of the present disclosure, in the third aspect, in the microscope apparatus, the power in the optical axis direction by only the first moving member out of the first moving member and the second moving member is determined in accordance with a relationship between the information on the distance and information on a moving amount of the first moving member.

According to a fifth aspect of the present disclosure, in the first to fourth aspects, in the microscope apparatus, the first moving member is a piezoelectric element that deforms along the optical axis direction of the imaging optical system.

According to a sixth aspect of the present disclosure, in the first to fifth aspects, in the microscope apparatus, the drive source includes a pulse motor, and the second moving member moves in the optical axis direction by receiving the power from the pulse motor.

According to a seventh aspect of the present disclosure, in the first to sixth aspects, in the microscope apparatus, the microscope apparatus further comprises a detection section that is provided along the optical axis direction and detects a position of the specific region in the optical axis direction, where the controller controls the drive source to cause the imaging element to form the image of the observation target light in the focus state when the optical axis reaches the specific region by applying the power in the optical axis direction by the first moving member and the second moving member to the imaging optical system based on the information on the distance, in a case where a position detected by the detection section is the position of the out-of-focus state in a state where the first moving member is moved to the limit of the movable range, before the optical axis reaches the specific region among the respective regions in a state where the imaging element scans the respective regions in the container.

According to an eighth aspect of the present disclosure, in the seventh aspect, in the microscope apparatus, the detection section includes a pair of sensors that are provided side by side with the imaging optical system interposed therebetween in a main scanning direction with respect to the respective regions, and that detect the position of the specific region in the optical axis direction respectively, and the controller controls the drive source to cause the imaging element to form the image of the observation target light in the focus state when the optical axis reaches the specific region by applying the power in the optical axis direction by the first moving member and the second moving member to the imaging optical system based on the information on the distance, in a case where a position detected by a sensor of the pair of sensors that reaches the specific region in the main scanning direction earlier is the position of the out-of-focus state in a state where the first moving member is moved to the limit of the movable range, before the optical axis reaches the specific region among the respective regions in a state where the imaging element scans the respective regions in the container.

According to a ninth aspect of the present disclosure, in the seventh or eighth aspect, the microscope apparatus further comprises a holding member that holds the drive source, where the detection section is held by the holding member.

According to a tenth aspect of the present disclosure, in the first to ninth aspects, in the microscope apparatus, the imaging optical system has an objective lens movable in the optical axis direction, and the objective lens is moved in the optical axis direction by the first moving member and the second moving member.

According to an eleventh aspect of the present disclosure, in the first to tenth aspects, the container is a well plate having a plurality of wells.

According to a twelfth aspect of the present disclosure, there is provided a program causing a computer to function as the controller included in the microscope apparatus according to the first to eleventh aspects.

According to the technology of the present disclosure, it is possible to cause the focus control to follow the position of each region in the optical axis direction in accordance with a scanning situation.

BRIEF DESCRIPTION OF THE DRAWINGS

FIG. 7 is a conceptual diagram showing an example of a scanning position of an observation target region in a cultivation container installed on a stage of the microscope apparatus according to the first embodiment.

DESCRIPTION OF THE PREFERRED EMBODIMENTS

Hereinafter, details of each embodiment of the present disclosure will be described with reference to the drawings.

First Embodiment

<Overview of System>

Figure 1:
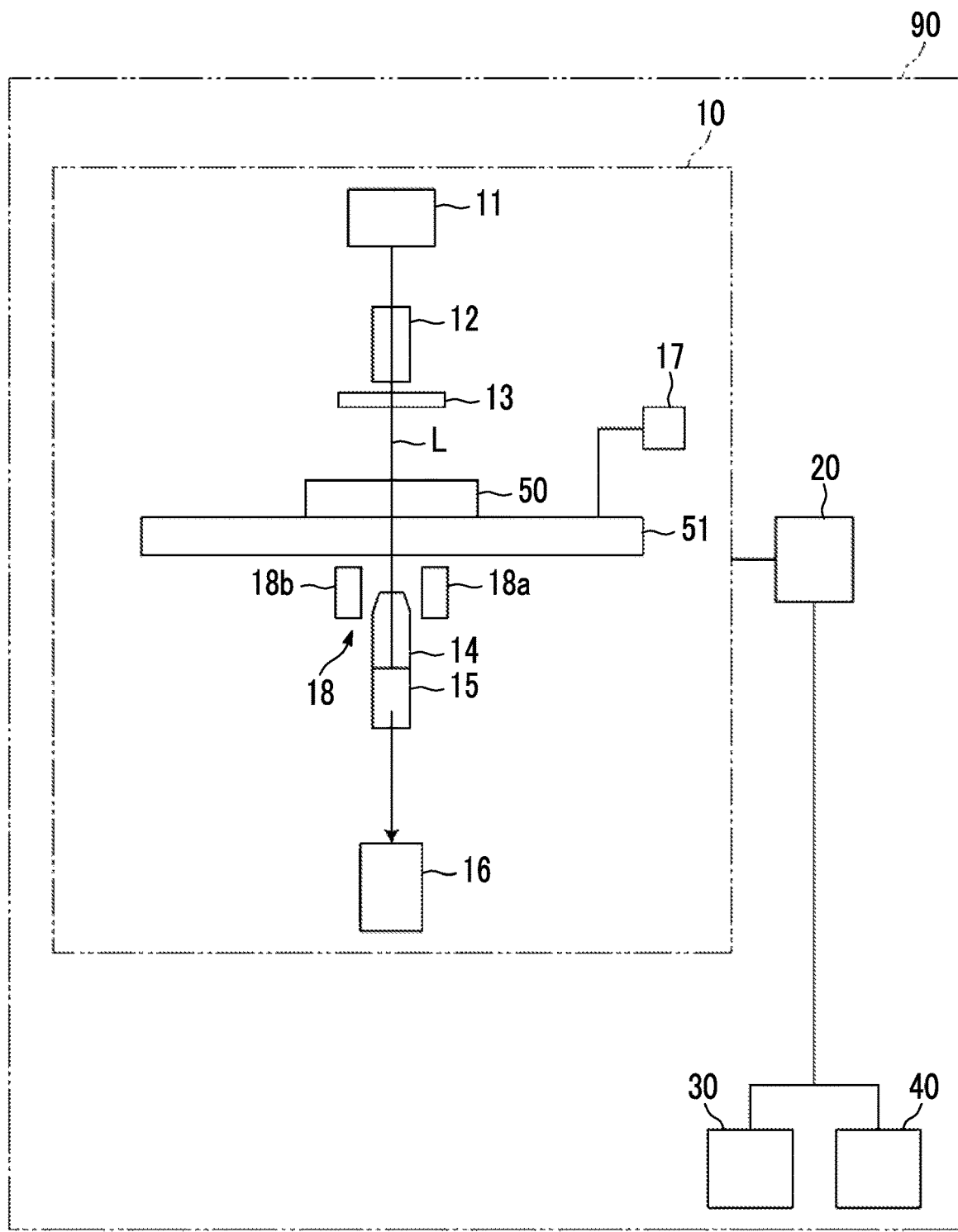
FIG. 1 is a schematic configuration diagram showing an example of a configuration of a microscope apparatus according to a first embodiment.

Hereinafter, a microscope apparatus 90 according to a first embodiment of the technology of the present disclosure will be described in detail with reference to the drawings. FIG. 1 is a block diagram showing a schematic configuration of a microscope apparatus 90 according to a first embodiment.

The microscope apparatus 90 includes a microscope apparatus main body 10 and a microscope control device 20. The microscope apparatus 90 may be connected to a display device 30 and an input device 40 via the microscope control device 20.

The microscope apparatus 90 is an example of the microscope apparatus of the present disclosure.

The microscope apparatus main body 10 captures a phase difference image of cultured cells to be observed by the microscope apparatus 90. Specifically, as shown in FIG. 1 as an example, the microscope apparatus main body 10 comprises a white light source 11 that emits white light, a condenser lens 12, a slit plate 13, an imaging optical system 14, an imaging optical system driving section 15, an imaging element 16, and a detection section 18.

The imaging element 16 is an example of an imaging element of the present disclosure. The imaging optical system 14 is an example of an imaging optical system of the present disclosure.

The slit plate 13 is one obtained by providing a ring-shaped slit that transmits white light with respect to a light-shielding plate that shields white light emitted from the white light source 11, and the white light passes through the slit to form a ring-shaped illumination light L.

Figure 2:
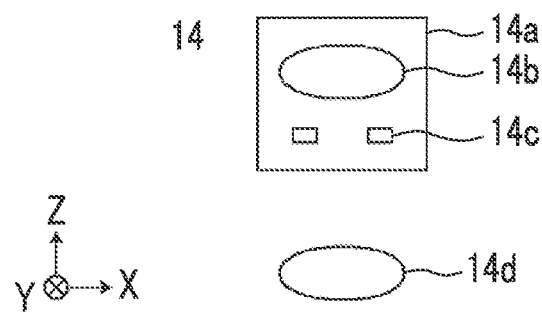
FIG. 2 is a schematic diagram showing an example of a configuration of an imaging optical system included in the microscope apparatus according to the first embodiment.

As shown in FIG. 2 as an example, the imaging optical system 14 comprises a phase difference lens 14a and an imaging lens 14d. The phase difference lens 14a comprises an objective lens 14b and a phase plate 14c. The phase plate 14c has a configuration in which a phase ring is formed in a transparent plate that is transparent with respect to a wavelength of the illumination light L. The size of the slit of the above-described slit plate 13 is in a cooperative relationship with the phase ring of the phase plate 14c.

The phase ring has a configuration in which a phase membrane that shifts a phase of incident light by ¼ of a wavelength and a light-reducing filter that reduces incident light are formed in a ring shape. The phase of direct light incident onto the phase ring shifts by ¼ of a wavelength after passing through the phase ring, and its brightness is weakened. On the other hand, most of diffracted light diffracted by an observation target passes through the transparent plate of the phase plate 14c, and its phase and brightness are not changed.

The phase difference lens 14a having the objective lens 14b is moved in an optical axis direction of the objective lens 14b by the imaging optical system driving section 15 shown in FIG. 1, for example. In the first embodiment, the optical axis direction of the objective lens 14b and a Z direction (vertical direction) are the same direction. An auto-focus control is performed as the phase difference lens 14a is moved so as to match the focus position in the Z direction, and contrast of a phase difference image captured by the imaging element 16 is adjusted.

Here, in the first embodiment, the Z-directional position of the bottom surface of a cultivation container 50 described later, which is previously installed on a stage 51 described later, is detected and set as a reference plane. Then, a reference position in the Z direction is set for the imaging optical system 14 so as to be in a focus position with respect to the reference plane.

In a case where a boundary surface between the bottom of the cultivation container 50, that is, the bottom of the cultivation container 50 (described later) containing the observation target and the observation target matches the reference plane, the imaging optical system 14 placed at the reference position should be in a focus state with respect to the observation target. However, the bottom surface of the cultivation container 50 is close to the reference plane but is not completely matched. This is because there are variations on the bottom surface of the cultivation container 50 due to a fabrication error or the like. That is, the actual focus position with respect to each region on the bottom surface of the cultivation container 50 often does not match the reference position.

The auto-focus control according to the present disclosure is to correct a deviation between the respective regions on the bottom surface of the cultivation container 50 and the reference plane by moving the imaging optical system 14 in the Z direction, and control so that the imaging optical system 14 is actually in a focus position with respect to the observation target in each region.

Further, a configuration in which a magnification of the phase difference lens 14a is changeable may be used. Specifically, a configuration in which the phase difference lenses 14a or the imaging optical systems 14 having different magnifications are interchangeable may be used. The interchange between the phase difference lens 14a and the imaging optical systems 14 may be automatically performed, or may be manually performed by a user.

Figure 3:
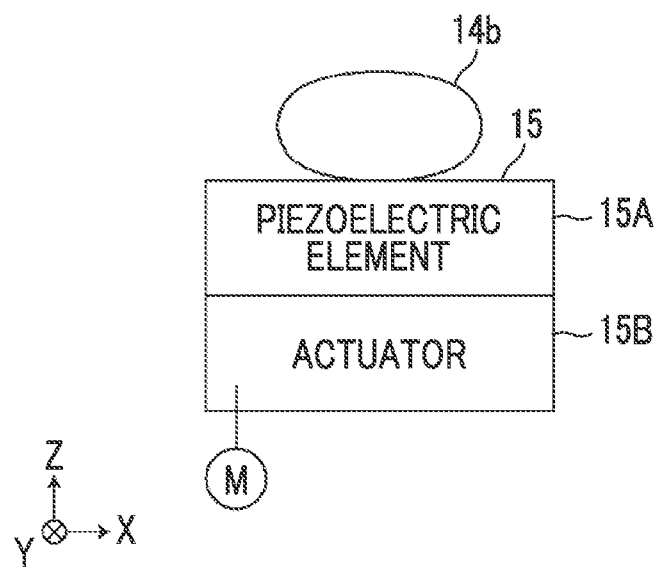
FIG. 3 is a schematic configuration diagram showing an example of a configuration of an imaging optical system driving section included in the microscope apparatus according to the first embodiment.

As shown in FIG. 3 as an example, the imaging optical system driving section 15 includes an actuator 15B and a piezoelectric element 15A disposed vertically above the actuator 15B. The actuator 15B is connected to a pulse motor M as an example. The piezoelectric element 15A and the actuator 15B function as a Z-directional transport device for moving the objective lens 14b of the imaging optical system 14 in the Z direction, based on a control signal output from a focus controller 21 described later.

The imaging optical system driving section 15 is an example of a drive source of the present disclosure. The piezoelectric element 15A is an example of a first moving member of the present disclosure, and the actuator 15B is an example of a second moving member of the present disclosure.

In a case where the piezoelectric element 15A as the Z-directional transport device and the actuator 15B are compared, there are the following differences. The piezoelectric element 15A can move the imaging optical system 14 in the Z direction at a higher speed than the actuator 15B. On the other hand, a drivable range of the piezoelectric element 15A is smaller than that of the actuator 15B.

The imaging optical system driving section 15 is configured to cause phase difference light passed through the phase difference lens 14a to pass through as it is.

Further, the drive source of the actuator 15B is not limited to the pulse motor, but may be any drive source having a sufficiently large drivable range as compared with the piezoelectric element 15A. As a drive source of the actuator 15B, a solenoid or other known configuration can be used. Moreover, the imaging optical system driving section 15 may be configured by a combination of a first piezoelectric element having a small drivable range and a second piezoelectric element having a large drivable range or a combination of a first actuator driven by a small pulse motor and a second actuator driven by a large pulse motor.

The imaging lens 14d receives phase difference light that has passed through the phase difference lens 14a and the imaging optical system driving section 15, and forms an image on the imaging element 16.

The imaging element 16 captures an image on the basis of the phase difference image formed by the imaging lens 14d. As the imaging element 16, a charge-coupled device (CCD) image sensor, a complementary metal-oxide semiconductor (CMOS) image sensor, or the like may be used. As the imaging element, an imaging element in which color filters of red, green, and blue (R, G, and B) are provided may be used, or a monochromic imaging element may be used.

The detection section 18 detects the position of the cultivation container 50 installed on the stage 51 in the Z direction (vertical direction). The detection section 18 specifically comprises a first displacement sensor 18a and a second displacement sensor 18b. The first displacement sensor 18a and the second displacement sensor 18b in the first embodiment are laser displacement meters that irradiate the cultivation container 50 with laser light and detect the reflected light to detect the Z-directional position of the bottom surface of the cultivation container 50. In the present disclosure, the bottom surface of the cultivation container 50 refers to a boundary surface between the bottom of the cultivation container 50 and cells to be observed, that is, an observation target installation surface.

The cultivation container 50 is an example of a container of the present disclosure.

Figure 8A:
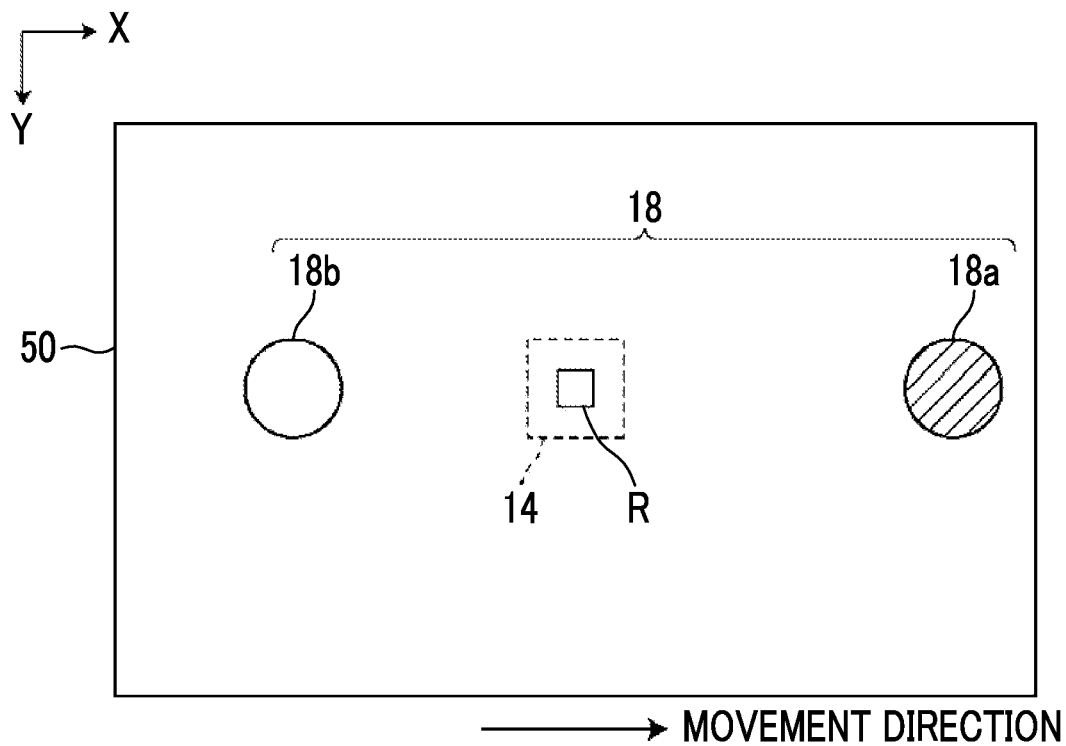
FIG. 8A is a conceptual diagram showing a first form example indicating a positional relationship of an imaging optical system, first and second displacement sensors, and a cultivation container in a case where an observation target region is located at an optional position in a cultivation container installed on a stage of the microscope apparatus according to the first embodiment.
Figure 8B:
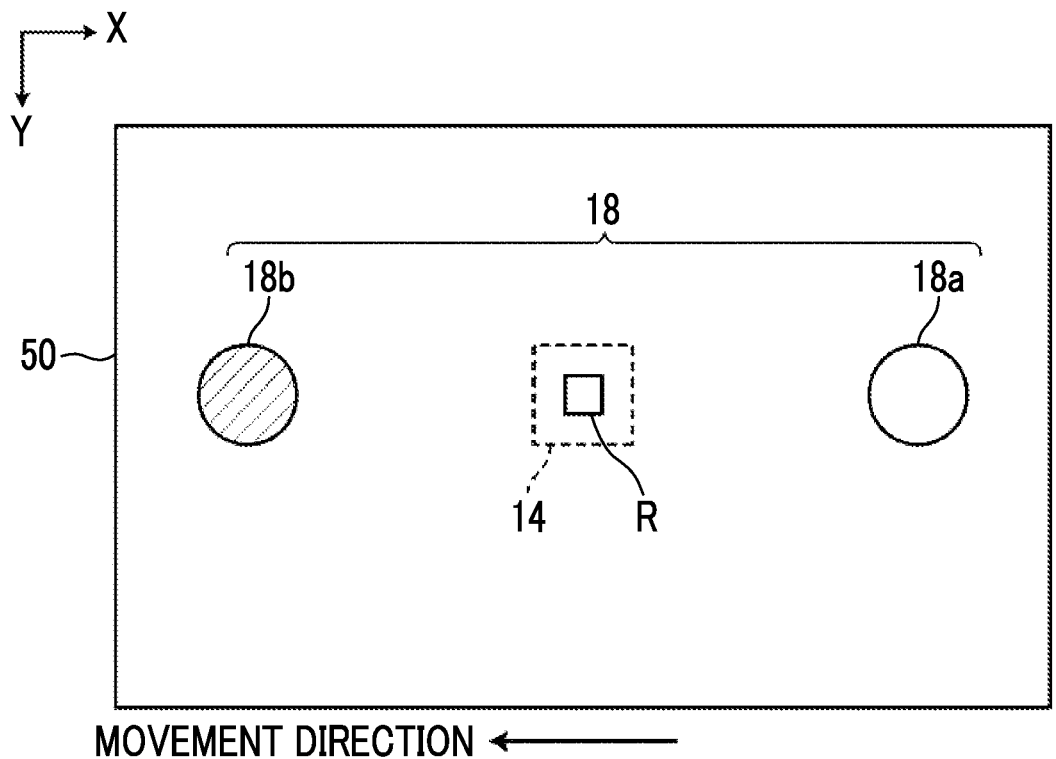
FIG. 8B is a conceptual diagram showing a second form example indicating a positional relationship of an imaging optical system, first and second displacement sensors, and a cultivation container in a case where an observation target region is located at an optional position in a cultivation container installed on a stage of the microscope apparatus according to the first embodiment.

In the first embodiment, the first displacement sensor 18a and the second displacement sensor 18b are provided side by side in an X direction shown in FIG. 1 with the phase difference lens 14a interposed therebetween (see FIGS. 8A and 8B).

As an example, each of the first displacement sensor 18a and the second displacement sensor 18b is disposed so as to be separated from the phase difference lens 14a by a distance nine times the one side D of the square observation target region R, that is, by 9D. The observation target region R will be described later.

Figure 6:
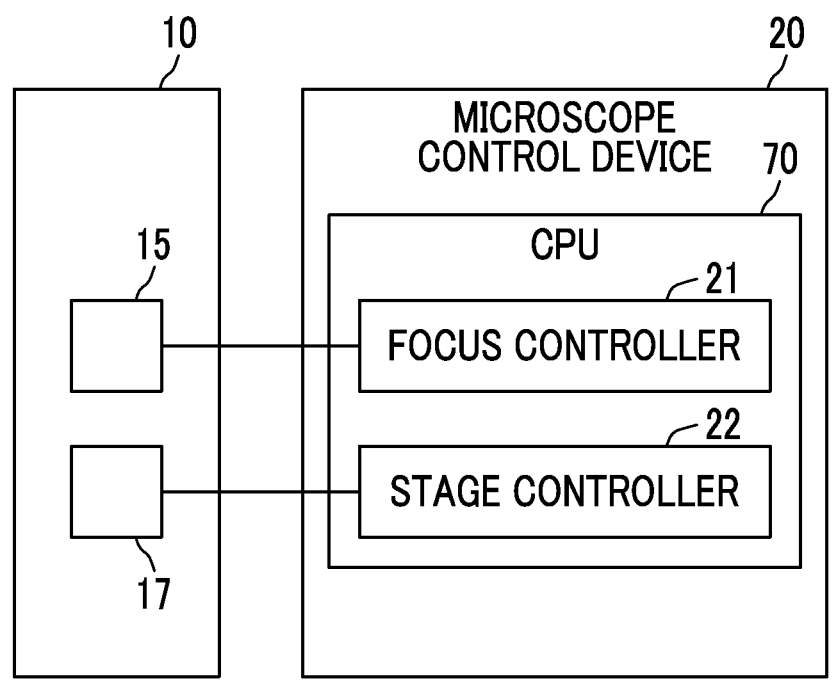
FIG. 6 is a block diagram showing a main configuration of a part related to a technology of the present disclosure of a microscope apparatus main body and a microscope control device included in the microscope apparatus according to the first embodiment.

Information on the Z-directional position of the cultivation container 50 detected by the detection section 18 is output to a focus controller 21 described later (see FIG. 6), and the focus controller 21 controls the imaging optical system driving section 15 based on the input position information to perform the auto-focus control. The detection of the position of the cultivation container 50 by the first displacement sensor 18a and the second displacement sensor 18b and the auto-focus control by the focus controller 21 will be described later.

Between the slit plate 13, and the phase difference lens 14a and the detection section 18, the stage 51 is provided. On the stage 51, the cultivation container 50 in which cells that are observation targets are contained is installed.

In the microscope apparatus according to the first embodiment, as shown in FIG. 7 as an example, a well plate having six wells W is used as the cultivation container 50. However, the cultivation container 50 is not limited to this. For example, a well plate having 24 or 96 wells can be used as the cultivation container 50, and a well plate having an optional number of wells or a container other than a well plate such as a petri dish or dish can be used. An appropriate container can be selected as the cultivation container 50 depending on the observation target and the purpose of the observation.

Further, examples of cells contained in the cultivation container 50 include multipotential stem cells such as induced pluripotent stem (iPS) cells and embryonic stem (ES) cells, cells of nerve induced and differentiated from stem cells, skin, myocardium, and liver, and cells of skin, retina, myocardium, blood cells, nerve, and organ extracted from the human body.

The stage 51 is moved in the X direction and a Y direction orthogonal to each other by a stage driving device 17 (see FIGS. 1 and 6) described later. The X direction and the Y direction are directions orthogonal to the Z direction, and are directions orthogonal to each other in a horizontal plane. In the first embodiment, the X direction is a main scanning direction, and the Y direction is a sub scanning direction.

Figure 4:
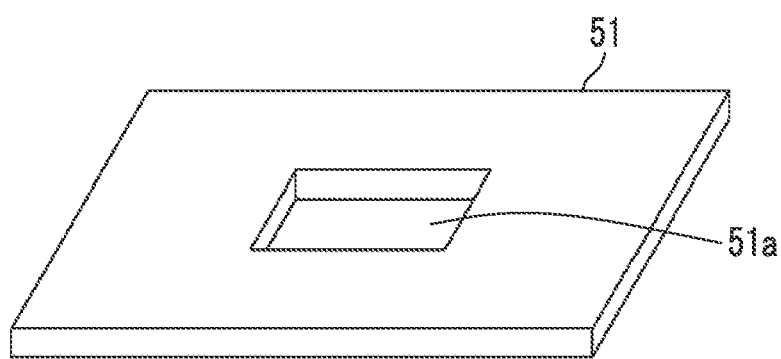
FIG. 4 is a schematic configuration diagram showing an example of a configuration of a stage included in the microscope apparatus according to the first embodiment.

As shown in FIG. 4 as an example, a rectangular opening 51a is formed in a center of the stage 51. The cultivation container 50 is installed on a member forming the opening 51a, and phase difference light of cells in the cultivation container 50 passes through the opening 51a.

The display device 30 displays a composite phase difference image generated and stored in wide view image acquisition processing described later, and comprises, for example, a liquid crystal display. Further, the display device 30 may be configured by a touch panel, and may also be used as the input device 40.

The input device 40 comprises a mouse, a keyboard, and the like, and receives various setting inputs by the user. The input device 40 receives setting inputs such as an instruction to change the magnification of the phase difference lens 14a and an instruction to change the moving velocity of the stage.

Figure 5:
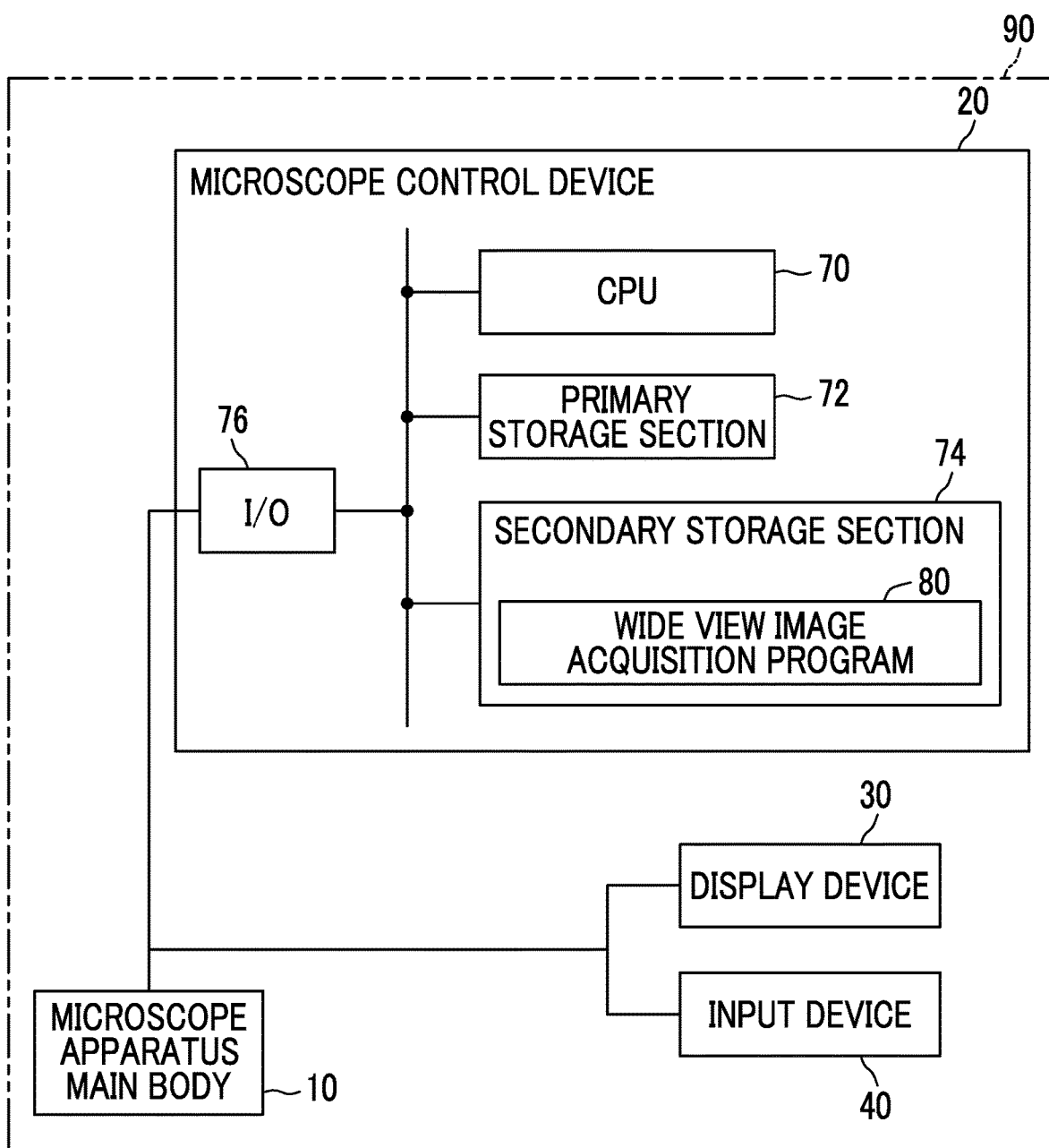
FIG. 5 is a block diagram showing an example of a hardware configuration of an electric system of the microscope apparatus according to the first embodiment.

Next, the configuration of the microscope control device 20 that controls the microscope apparatus main body 10 will be described. FIG. 5 shows an example of a configuration of an electric system of the microscope control device 20.

The microscope control device 20 comprises a computer. The computer of the microscope control device 20 comprises a central processing unit (CPU) 70, a primary storage section 72, a secondary storage section 74, an input/output interface (I/O) 76, and the like. The CPU 70, the primary storage section 72, the secondary storage section 74, and the I/O 76 are connected by a bus line.

The CPU 70 controls the entire microscope apparatus. The primary storage section 72 is a volatile memory used as a work area or the like in a case of executing various programs. An example of the primary storage section 72 includes a random access memory (RAM). The secondary storage section 74 is a non-volatile memory in which various programs and various parameters are stored in advance, and stores a wide view image acquisition program 80 which is an example of a program according to the technology of the present disclosure. Examples of the secondary storage section 74 include an electrically erasable programmable read-only memory (EEPROM), a flash memory, and the like. The I/O 76 controls transmission and reception of various information between the microscope apparatus main body 10 and the microscope control device 20.

The CPU 70 reads out the wide view image acquisition program 80 from the secondary storage section 74. Then, the CPU 70 develops the read wide view image acquisition program 80 in the primary storage section 72 and executes the developed wide view image acquisition program 80, thereby operating as the focus controller 21 and the stage controller 22 illustrated in FIG. 6 as an example.

The stage controller 22 controls the stage driving device 17 to move the stage 51 in the X direction and the Y direction. The stage driving device 17 is, for example, an actuator having a piezoelectric element or the like.

The focus controller 21 performs control (auto-focus control) on the imaging optical system driving section 15 based on the information on the Z-directional position of the cultivation container 50 detected by the detection section 18. The auto-focus control is realized by driving the imaging optical system driving section 15 and moving the objective lens 14b of the imaging optical system 14 in the optical axis direction.

The focus controller 21 is an example of a controller according to the technology of the present disclosure. The focus controller 21 controls the imaging optical system driving section 15 to cause the imaging element 16 to form the image of the observation target light (observation light indicating the observation target in the cultivation container 50) in a focus state when the optical axis of the imaging optical system 14 reaches an observation scheduled region by applying the power in the Z direction by the piezoelectric element 15A and the actuator 15B to the imaging optical system 14, based on information on the distance in the optical axis direction between the region (that is, the region to be imaged by the imaging element at the imaging position) currently being imaged by the imaging element and the observation scheduled region in a case where a predetermined condition is satisfied in a state where the imaging element is scanning each region in the cultivation container 50. The state in which the imaging element scans respective regions in the cultivation container 50 means a state in which the stage 51 is moved in the XY plane by the X direction and the Y direction to move the imaging element with respect to each observation region in the cultivation container 50 such that the imaging element 16 scans the respective regions in the cultivation container 50. Further, the predetermined condition refers to a condition that, the observation scheduled region exists at a position of an out-of-focus state in the optical axis direction in a state where the piezoelectric element 15A is deformed by a limit amount of the deformation amount of the piezoelectric element 15A.

<Wide View Image Acquisition Processing>

Hereinafter, the process of acquiring a wide view image by the microscope apparatus 90 according to the first embodiment of the present disclosure will be described in detail.

FIGS. 10, 11, 13, 16, and 17 are flowcharts illustrating an example of a program for performing the wide view image acquisition processing in the first embodiment. FIGS. 10, 11, 13, 16, and 17 show an example of a program executed by the microscope control device 20.

Here, the program executed by the microscope control device 20 is specifically executed by the CPU 70 of the microscope control device 20 functioning as the focus controller 21 and the stage controller 22.

In the following, for the convenience of explanation, the wide view image acquisition processing will be described in three parts of (1) start of a flow, (2) scanning processing, and (3) processing after the scanning processing.

[Start of Flow]

In the microscope apparatus 90 according to the first embodiment, scanning of the observation target is performed by the microscope apparatus main body 10 continuously capturing a narrow view image of the cultivation container 50 disposed on the stage 51 while the microscope control device 20 performs two-dimensional movement control on the stage 51 and focus control on the imaging optical system 14.

First, a user who desires to capture a wide view image of an observation target installs the cultivation container 50 containing cells to be observed on the stage 51.

As described above, in the first embodiment, as an example, a description will be given assuming that the cultivation container 50 is a well plate having six wells W.

Figure 10:
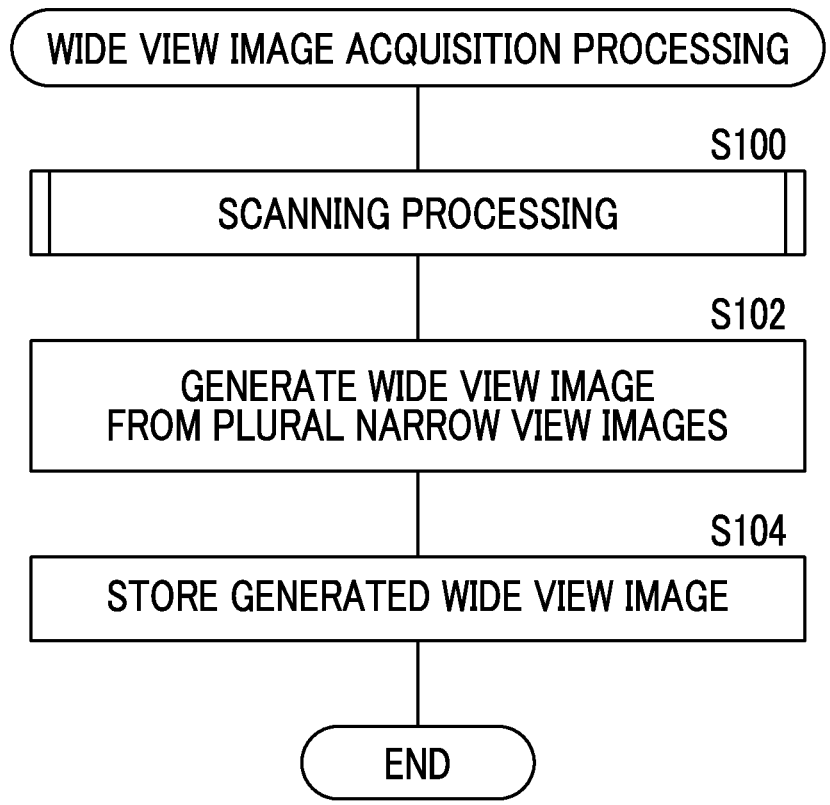
FIG. 10 is a flowchart showing an example of a flow of wide view image acquisition processing according to the first embodiment.

In a case where the user instructs the microscope control device 20 to capture a wide view image through the input device 40, the wide view image acquisition processing according to the first embodiment is started. Hereinafter, the CPU 70 of the microscope control device 20 reads out the wide view image acquisition program 80 from the secondary storage section 74 and executes the processing. FIG. 10 is a flowchart showing the entire processing.

[Scanning Processing]

In step S100, CPU 70 executes scanning processing. In step S100, stage moving processing (see FIG. 12), focus control preparation processing (see FIG. 13), piezoelectric element control processing (see FIG. 16), motor control processing (see FIG. 17), and continuous imaging of a narrow view image by the microscope apparatus main body 10 are executed.

The stage moving processing, the focus control preparation processing, the piezoelectric element control processing, the motor control processing, and the continuous imaging of the narrow view image by the microscope apparatus main body 10 are performed in synchronization with each other. Hereinafter, the processing will be described on the premise of this synchronous control.

(Stage Moving Processing Subroutine)

Figure 11:
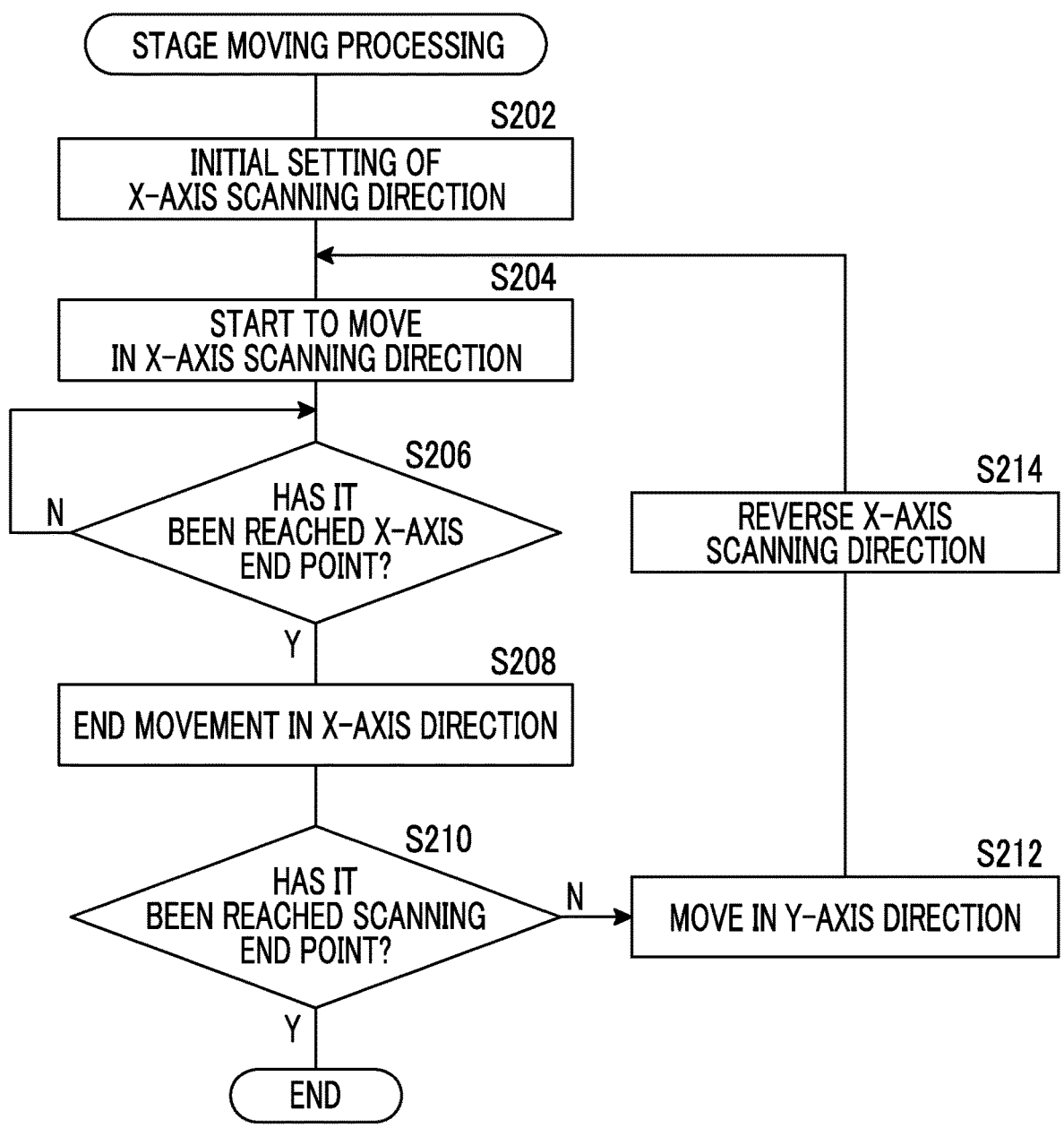
FIG. 11 is a flowchart showing an example of a flow of stage moving processing according to the first embodiment.

The stage moving processing included in step S100 in FIG. 10 is shown as a subroutine in FIG. 11. FIG. 11 is an example of a processing program executed by the CPU 70 of the microscope control device 20 functioning as the stage controller 22.

In step S202, the stage controller 22 performs an initial setting of the X-axis movement direction for the stage 51. As an example, the X-axis movement direction of the stage 51 is set to a negative direction.

Next, in step S204, the stage controller 22 causes the stage driving device 17 to start moving the stage 51 along the set X-axis movement direction. Immediately after the start of the subroutine in FIG. 11, since the X-axis movement direction is set to the negative direction in step S202, the stage 51 starts to move in the X-axis negative direction. In this case, as shown in FIG. 8A, the imaging optical system 14 of the stationary microscope apparatus main body 10 moves relatively to the stage 51 in the X-axis positive direction. In the following, the relative movement of the imaging optical system 14 (and the observation target region R) with respect to the stage 51 due to the movement of the stage 51 by the stage driving device 17 is referred to as the movement of the imaging optical system 14 (and the observation target region R) for the convenience of explanation.

FIGS. 8A and 8B are diagrams showing positional relationships on the XY plane between the imaging optical system 14 in a case where the observation target region R is located at an optional position on the bottom surface of cultivation container 50, the first displacement sensor 18a and the second displacement sensor 18b, and the cultivation container 50. The observation target region R is a region on the bottom surface of the cultivation container 50 where the microscope apparatus main body 10 can capture an image to generate a phase difference image. With the relative movement of the imaging optical system 14 with respect to the stage 51, the observation target region R also relatively moves with respect to the stage 51. Hereinafter, the traveling direction of the imaging optical system 14 and the observation target region R on the plane including the bottom surface of the cultivation container 50 accompanying the X-axis directional movement of the stage 51 is referred to as the X-axis scanning direction. Further, the XY plane including the bottom surface of the cultivation container 50 is referred to as a scanning plane.

Hereinafter, the observation target region R is assumed to be a square region for the convenience of explanation, but is not limited to this.

Note that, the microscope apparatus main body 10 comprises a horizontal position detection sensor not shown in FIG. 1. The stage controller 22 detects the current position of the observation target region R on the scanning plane in the stage 51 using the horizontal position detection sensor.

In the first embodiment, the observation target region R moves at a uniform velocity along the X-axis scanning direction.

In a case where the observation target region R of the imaging optical system 14 reaches an end point position on the scanning plane, the determination as to whether the observation target region R has reached the end point position in step S206 is positive. Here, the end point position is a position at which scanning in the X-axis direction on the scanning plane ends, and is shown in FIG. 7.

On the other hand, the stage controller 22 continues to move the stage 51 in the X-axis movement direction by the stage driving device 17 until the determination in step S206 is positive. That is, the imaging optical system 14 continues to relatively move in the X-axis scanning direction with respect to the stage 51 until the determination in step S206 is positive.

In the process in which the observation target region R moves in the X-axis scanning direction, the CPU 70 of the microscope control device 20 causes the microscope apparatus main body 10 to capture an image of a region overlapping the observation target region R on the bottom surface of the cultivation container 50 to generate a plurality of phase difference images. That is, a phase difference image of each region on the bottom surface of the cultivation container 50 that is continuous along the X-axis scanning direction is generated.

Here, the focus control processing described later is executed in synchronization with the stage moving processing, and therefore it is noted that, in each region on the bottom surface of the cultivation container 50 superimposed in the observation target region R, the Z-directional position of the objective lens 14b of the imaging optical system 14 is set to the focus position. Accordingly, in the process in which the observation target region R relatively moves in the X-axis scanning direction, a phase difference image of a focus state is generated for each region on the bottom surface of the cultivation container 50 continuous in the X-axis scanning direction.

Further, the CPU 70 of the microscope control device 20 stores the plurality of generated phase difference images in the primary storage section 72, for example. Note that, the plurality of generated phase difference images may be stored in a cache memory (not shown) of the CPU 70 or the secondary storage section 74.

In a case where the determination in step S206 is positive, the stage controller 22 ends the movement of the stage 51 along the X-axis scanning direction by the stage driving device 17 in step S208. Further, the CPU 70 of the microscope control device 20 ends the continuous capturing of the narrow view image by the microscope apparatus main body 10. Next, the processing proceeds to step S210.

In step S210, the stage controller 22 determines whether the observation target region R has reached a scanning end point E. The X-axis scanning end point E is a point at which the scanning processing ends on the bottom surface of the cultivation container 50, and is exemplarily shown in FIG. 6.

In a case where the determination in step S210 is negative, the processing proceeds to step S212.

In step S212, the stage controller 22 causes the stage driving device 17 to move the stage 51 by one unit in the Y-axis negative direction. Here, the one unit refers to a distance corresponding to a length D of one side of the observation target region R. In this regard, reference can be made to FIG. 7. Therefore, on the bottom surface of the cultivation container 50, the observation target region R moves by one unit in the Y-axis positive direction. Next, the processing proceeds to step S214.

In step S214, the stage controller 22 reverses the X-axis movement direction with respect to the stage 51. Thereby, the X-axis scanning direction of the observation target region R is reversed. Then, the processing of FIG. 11 returns to step S204, the stage controller 22 starts the X-axis scanning again, and the CPU 70 of the microscope control device 20 resumes the continuous capturing of the narrow view image by the microscope apparatus main body 10.

For example, in a case where step S214 is executed for the first time in the processing of FIG. 11, since the X-axis movement direction with respect to the stage 51 is set to the negative direction in step S202, the X-axis movement direction with respect to the stage 51 is set to the positive direction as a result of the reverse. In this case, in a case where the processing in FIG. 11 returns to step S204, the stage 51 starts to move in the X-axis positive direction. Accordingly, in this case, as shown in FIG. 8B, the imaging optical system 14 (and the observation target region R) of the stationary microscope apparatus main body 10 is relatively moved in the X-axis negative direction with respect to the stage 51.

The processing in FIG. 11 is continued until the determination in step S210 is positive.

As described above, in a case where the stage controller 22 executes the stage moving processing subroutine, the stage 51 is moved in the X direction and the Y direction, the observation target region R of the imaging optical system 14 scans the bottom surface of the cultivation container 50 two-dimensionally, and a phase difference image of each region is generated and stored.

The solid line M in FIG. 7 shows an example of the movement of the observation target region R on the scanning plane including the bottom surface of the cultivation container 50 in the scanning processing.

As shown in FIG. 7, the observation target region R of the imaging optical system 14 moves along the solid line M from a scanning start point S to a scanning end point E. That is, the observation target region R scans in the X-axis positive direction (rightward in FIG. 7), moves in the Y-axis positive direction (downward in FIG. 7), and further scans in the X-axis negative direction (leftward in FIG. 7). Next, the observation target region R is moved again in the Y-axis positive direction and scans again in the X-axis positive direction. As described above, the observation target region R scans the bottom surface of the cultivation container 50 two-dimensionally by repeatedly performing the reciprocating movement in the X direction and the movement in the Y direction.

The following points should be noted regarding the setting of the end point position and the stage moving velocity in the stage moving processing.

In the first embodiment, in order to perform scanning on the entire bottom surface of the cultivation container 50, as shown in FIG. 7, it is necessary to relatively move the imaging optical system 14, the first displacement sensor 18a, and the second displacement sensor 18b to the ranges R1 and R2 outside the range of the cultivation container 50 in the X direction. For the width of the range R1 in the X direction, it is necessary to ensure at least the distance between the first displacement sensor 18a and the imaging optical system 14 in the X direction, and for the width of the range R2 in the X direction, it is necessary to ensure at least the distance between the second displacement sensor 18b and the imaging optical system 14 in the X direction. In order to reduce the scanning time of the observation target region R as much as possible, it is desirable to make the scanning range of the observation target region R as narrow as possible. Therefore, it is desirable that the width of the range R1 in the X direction is the distance between the first displacement sensor 18a and the imaging optical system 14 in the X direction, and it is desirable that the width of the range R2 in the X direction is the distance between the second displacement sensor 18b and the imaging optical system 14 in the X direction.

On the other hand, in a case where the observation target region R is scanned in the range of the cultivation container 50 by moving the stage 51 in the X direction, it is desirable that the moving velocity of the observation target region R in the range of the cultivation container 50 is uniform. Accordingly, when the movement of the stage 51 in the X direction starts, it is necessary to accelerate the stage 51 to reach a certain velocity, and when the movement of the stage 51 in the X direction ends, it is necessary to decelerate the stage 51 from the certain velocity for stopping.

Further, in a case where the moving velocity of the stage 51 in the X direction is to be the certain velocity, it is possible to rapidly control such that the moving velocity becomes the certain velocity without making an acceleration region, but in a case where such a control is performed, a liquid level of a culture medium or the like contained in the cultivation container 50 together with cells shakes, which may cause lowering in image quality of a phase difference image. In addition, in a case where the stage 51 is stopped, the same problem may occur.

Accordingly, in the first embodiment, the range R1 and the range R2 shown in FIG. 7 are set to acceleration/deceleration regions for the stage 51 to move in the X direction. By setting the acceleration/deceleration regions on both sides of the range of the cultivation container 50 in the X direction in this way, it is possible to scan the observation target region R at a uniform velocity in the range of the cultivation container 50, without uselessly enlarging a scanning range. Further, it is possible to prevent the above-described shake of the liquid level of the culture medium.

(Focus Control Processing Subroutine)

Figure 13:
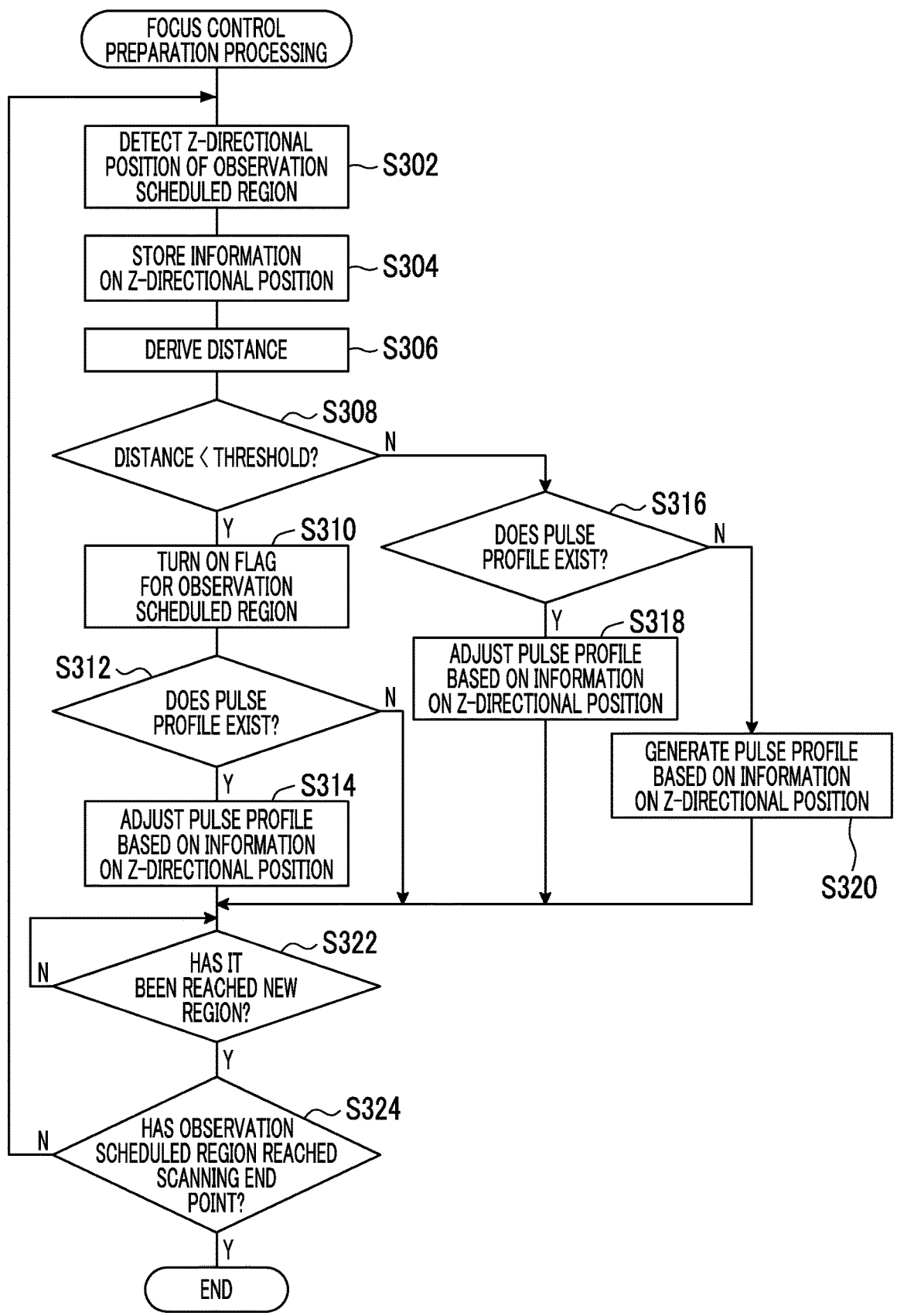
FIG. 13 is a flowchart showing an example of a flow of focus control preparation processing according to the first embodiment.
Figure 16:
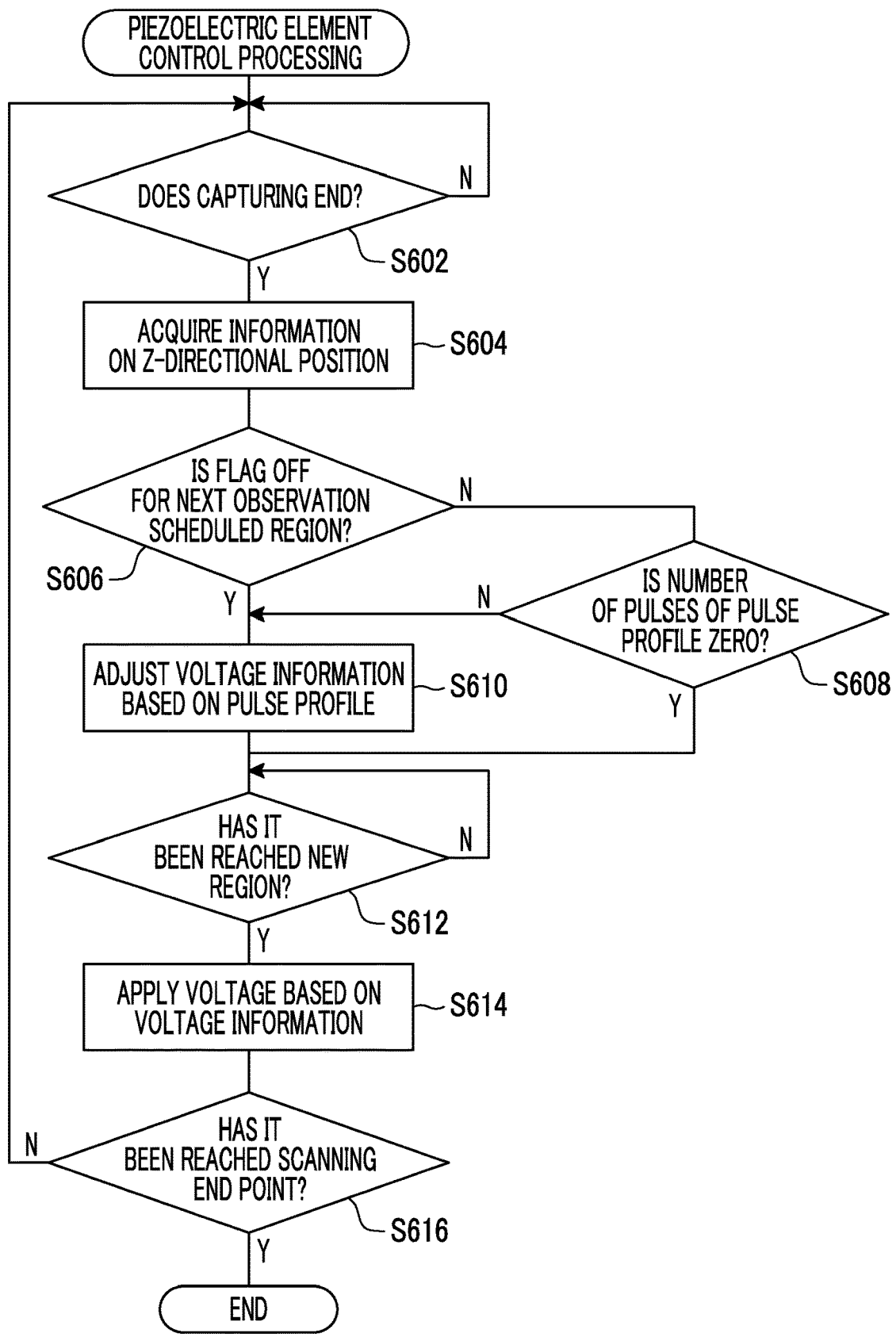
FIG. 16 is a flowchart showing an example of a flow of piezoelectric element control processing according to the first embodiment.
Figure 17:
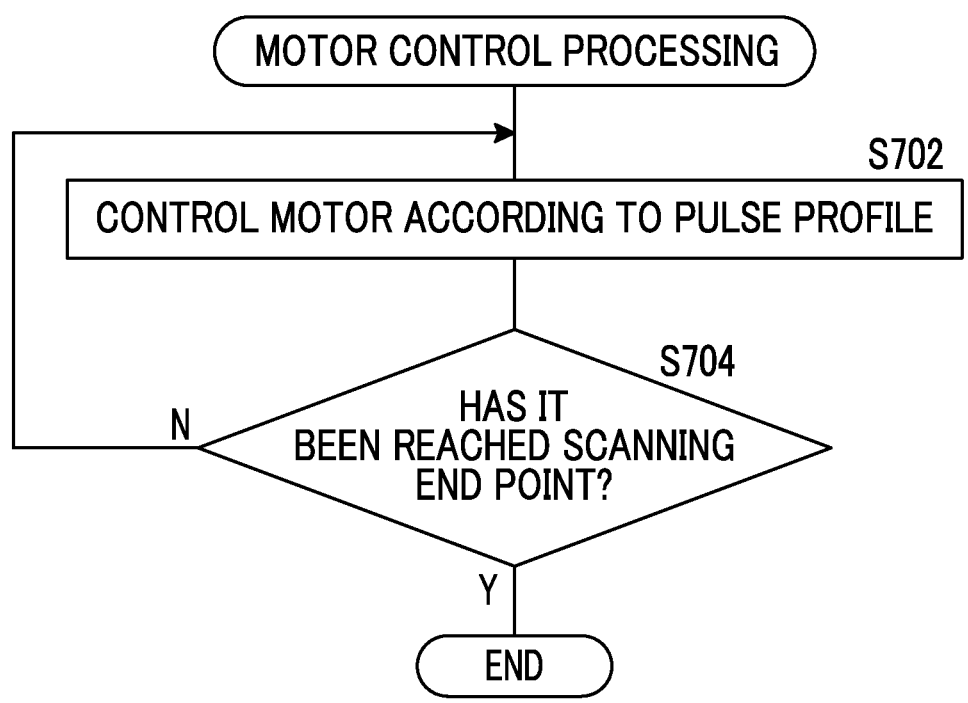
FIG. 17 is a flowchart showing an example of a flow of motor control processing according to the first embodiment.
Figure 18:
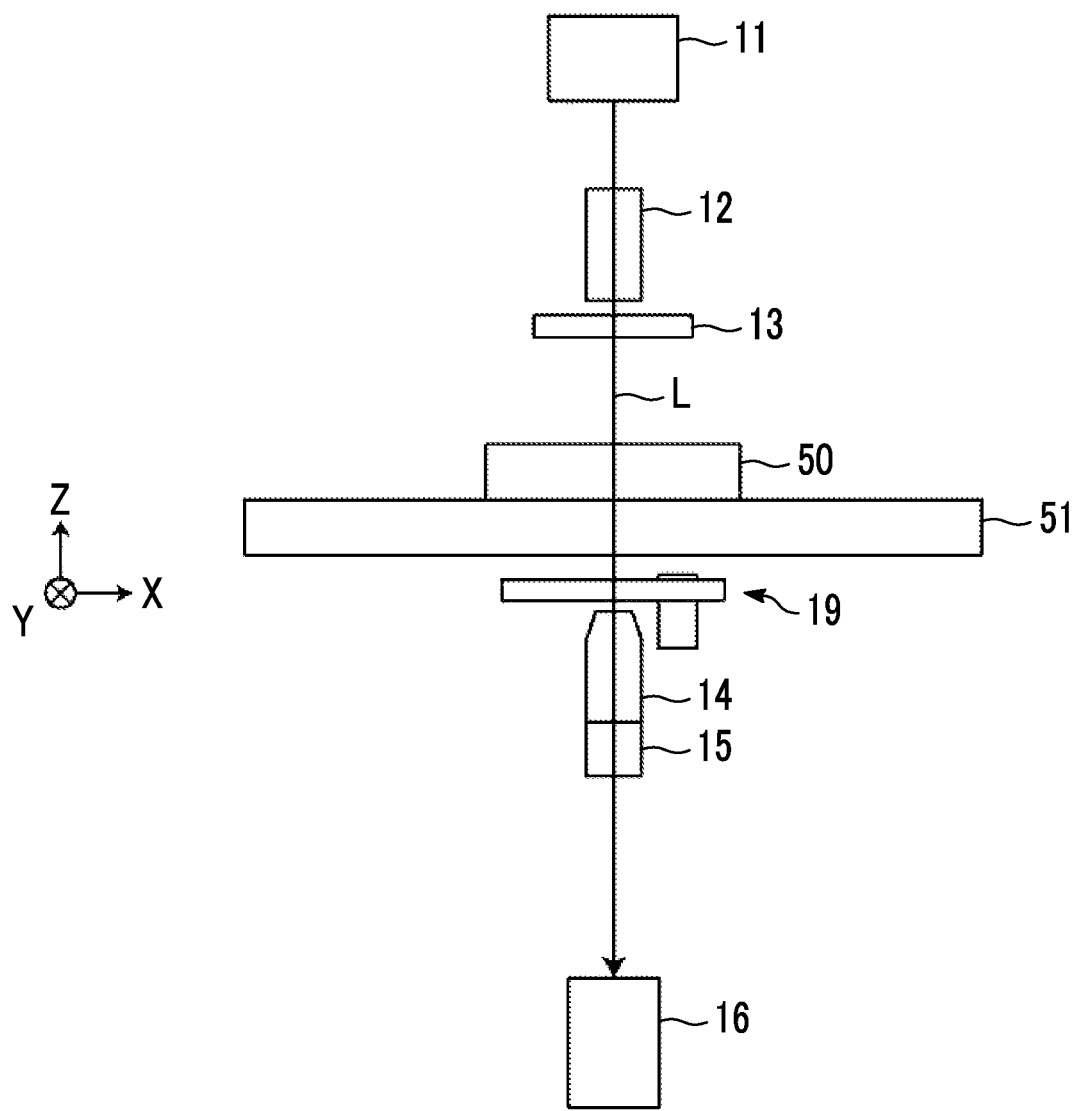
FIG. 18 is a schematic configuration diagram showing an example of a configuration of a microscope apparatus according to a second embodiment.

The focus control processing included in step S100 of FIG. 10 is shown as a subroutine in FIGS. 13, 16, and 17.

As described above, in the first embodiment, the first displacement sensor 18a and the second displacement sensor 18b are provided side by side in the X direction with the imaging optical system 14 interposed therebetween as shown in FIGS. 8A and 8B. Therefore, in the stage moving processing described above, in a case where the observation target region R of the imaging optical system 14 scans each region on the bottom surface of the cultivation container 50 continuous along the X direction, the detection section 18 can detect the Z-directional position of the bottom surface of the cultivation container 50 with respect to the region positioned forward of the position of the observation target region R in the X-axis scanning direction.

Specifically, in a case where the observation target region R is moving in the direction of the arrow shown in FIG. 8A (rightward in FIG. 8A), among the first displacement sensor 18a and the second displacement sensor 18b, the first displacement sensor 18a positioned forward of the observation target region R in the X-axis scanning direction detects the Z-directional position of the bottom surface of the cultivation container 50. In a case where the observation target region R further moves to the right in FIG. 8A, in each region on the bottom surface of the cultivation container 50 along the X-axis scanning direction, the Z-directional position of the objective lens 14b of the imaging optical system 14 can be adjusted to the focus position by executing focus control based on parameters including the Z-directional position of the bottom surface of the cultivation container 50 detected by the first displacement sensor 18a and the height of the reference plane of the cultivation container 50 detected in advance. That is, by executing the focus control, in a case where the observation target region R moves to the right in FIG. 7, each region can be captured while keeping the imaging optical system 14 in a focus state with respect to the bottom surface of the cultivation container 50.

On the other hand, in a case where the observation target region R is moving in the direction of the arrow shown in FIG. 8B (leftward in FIG. 8B), among the first displacement sensor 18a and the second displacement sensor 18b, the second displacement sensor 18b positioned forward of the observation target region R in the X-axis scanning direction detects the Z-directional position of the bottom surface of the cultivation container 50. Then, as described with reference to FIG. 8A, by executing the focus control, in a case where the observation target region R moves to the left in FIG. 8B, each region can be captured while keeping the imaging optical system 14 in a focus state with respect to the bottom surface of the cultivation container 50.

Thus, by switching the Z-directional position detection of the bottom surface of the cultivation container 50 using the first displacement sensor 18a and the Z-directional position detection of the bottom surface of the cultivation container 50 using the second displacement sensor 18b in accordance with the movement direction of the observation target region R, prior to capturing the observation target region R, the position information of the cultivation container 50 in the Z direction in the position of the observation target region R can always be obtained.

The focus controller 21 performs a focus control by adjusting the Z-directional position of the objective lens 14b of the imaging optical system 14 by using the imaging optical system driving section 15 including the piezoelectric element 15A and the actuator 15B. Specifically, the focus controller 21 executes the focus control by controlling the amount of voltage applied to the piezoelectric element 15A and the pulse input to the pulse motor M for driving the actuator 15B.

Normally, the focus controller 21 executes focus control processing by using only the piezoelectric element 15A. As described above, the piezoelectric element 15A can move the imaging optical system 14 in the Z direction at a higher speed than the actuator 15B. However, since the piezoelectric element 15A has a smaller drivable range than the actuator 15B, a situation may occur in which the objective lens 14b cannot be moved a required distance only by the piezoelectric element 15A.

Description will be made regarding this with reference to FIG. 12. For convenience, the following description is based on the assumption that the observation target region R moves in the X-axis positive direction as shown in FIG. 8A.

Figure 9:
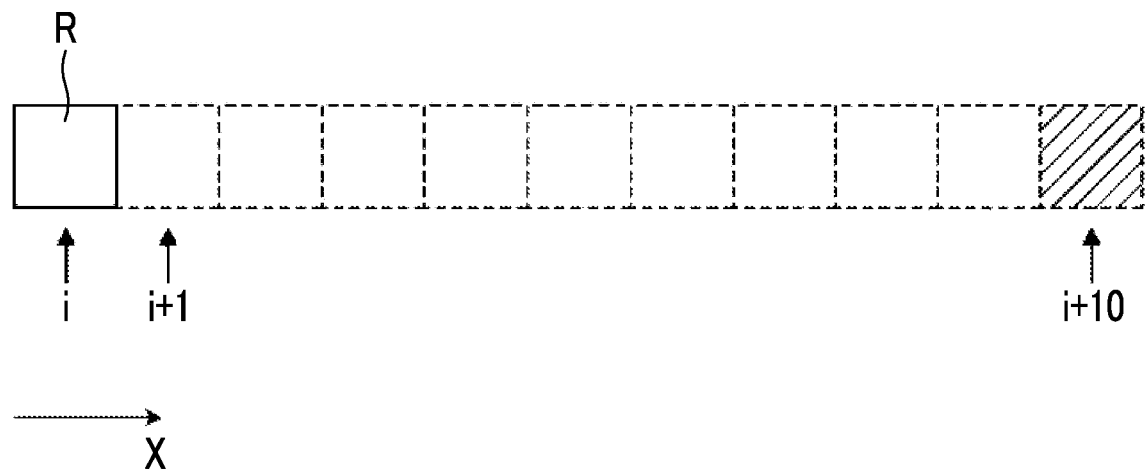
FIG. 9 is a state transition diagram for explaining an example of a timing of an auto-focus control in the microscope apparatus according to the first embodiment.

For convenience of explanation, it is assumed that the X-axis direction of the bottom surface of the cultivation container 50 is divided by one side D of the observation target region R. In a case where the observation target region R is in the I-th region, the observation scheduled region is disposed in the (I+10)-th region. That is, the observation scheduled region is positioned in a region ten units ahead of the observation target region R in the X-axis scanning direction. FIG. 9 is a diagram showing the above relationship.

Here, the observation scheduled region is a region on the bottom surface of the cultivation container 50 positioned vertically above the first displacement sensor 18a, and is a region where the observation target region R is overlapped after a predetermined time is elapsed. As described above, as an example, the first displacement sensor 18a is disposed so as to be separated from the phase difference lens 14a in the X direction by a distance that is nine times the one side D of the observation target region R.

The observation scheduled region is an example of a specific region in the present disclosure.

Figure 12:
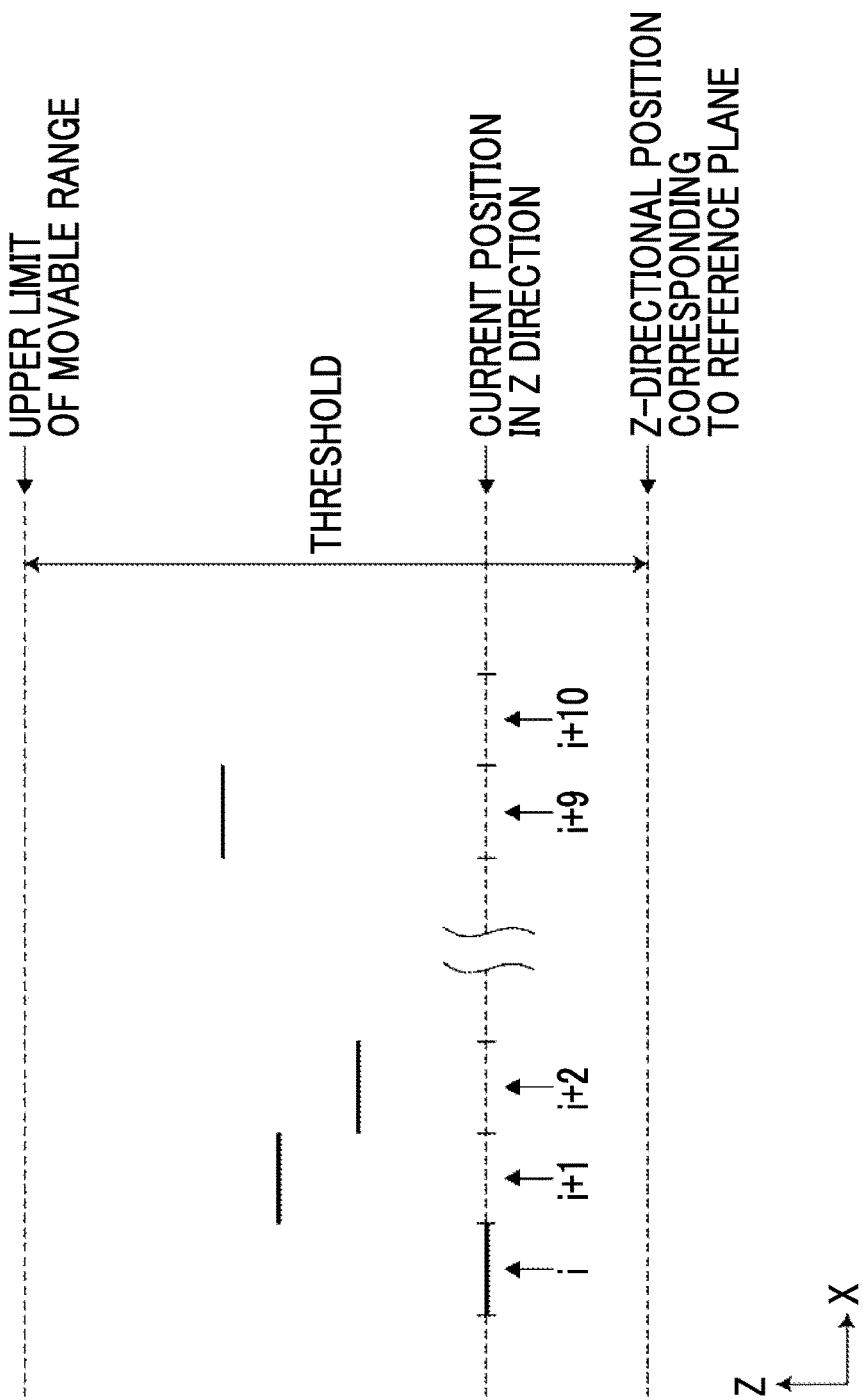
FIG. 12 is a conceptual diagram showing an example of a relationship between an observation target region and a distance in a Z direction.

FIG. 12 is a diagram showing the focus position in each region from the I-th region to (I+10)-th region shown in FIG. 9. In FIG. 12, the observation target region R is currently positioned in the I-th region, and the observation scheduled region is the (I+10)-th region.

In FIG. 12, the lower dashed line represents the height (the Z-directional position of the objective lens 14b at the focus position with respect to the reference plane) corresponding to the reference plane of the bottom surface of the cultivation container 50, the center dashed line represents the current Z-directional position of the objective lens 14b, and the upper dashed line represents the upper limit of the drivable range of the piezoelectric element 15A. Further, horizontal bars represent the focus positions of the respective regions from the I-th region to the (I+10)-th region. In the preceding scan, the Z-directional position of the bottom surface of the cultivation container 50 has already been detected for each of the I-th to (I+10)-th regions by the first displacement sensor 18a. The focus position in each region can be derived by subtracting the detected Z-directional position of each region from the Z-directional position of the cultivation container 50 on the reference plane.

The observation target region R moves each region in the X-axis scanning direction from the I-th region to the (I+1)-th region, the (I+2)-th region, and the like to the (I+10)-th region (that is, the observation scheduled region) by synchronized stage moving processing. The focus controller 21 controls the imaging optical system driving section 15 to adjust the Z-directional position of the objective lens 14b in each region to the respective focus position.

However, in the situation shown in FIG. 12, the difference between the focus position of the (I+10)-th region (that is, the observation scheduled region) and the focus position (that is, the lower dashed line of FIG. 12) corresponding to the reference plane exceeds a threshold. This situation is called a range over of the piezoelectric element 15A. The threshold is a value determined based on the drivable range of the piezoelectric element 15A, and is, for example, an upper limit of a movable distance of the piezoelectric element 15A. The threshold is an example of a limit of a movable range of the first moving member according to the present disclosure.

Therefore, the focus controller 21 cannot cause the imaging optical system 14 to reach the focus position at the time point when the observation target region R reaches the observation scheduled region, by the control using only the piezoelectric element 15A.

Therefore, the focus controller 21 executes the focus control by driving the actuator 15B in addition to the piezoelectric element 15A. As described above, the actuator 15B has a larger drivable range than the piezoelectric element 15A. Therefore, by driving the piezoelectric element 15A and the actuator 15B in synchronization with each other, the movement of the distance exceeding the threshold becomes possible.

Although not shown in FIG. 12, the objective lens 14b can be transported vertically below the reference plane by appropriately disposing the piezoelectric element 15A in the Z direction. That is, it is not necessary to match the lowest position where the piezoelectric element 15A is deformed in the Z direction to the position corresponding to the reference plane (lower dashed line in FIG. 12), and it is possible to set the lower limit of the drivable range below the reference plane in the Z direction.

Synchronous control of the piezoelectric element 15A and the actuator 15B can be appropriately performed by using various optimization calculation technologies. In the optimization calculation, it is particularly necessary to consider that the actuator 15B has a lower Z-directional moving velocity than the piezoelectric element 15A.

Hereinafter, as an example, an example of a case where the synchronous control of the piezoelectric element 15A and the actuator 15B is realized by using the pulse profile 400 (see FIG. 14) and the voltage table 500 (see FIG. 15) will be described.

The focus control processing according to the first embodiment includes a focus control preparation processing subroutine shown in FIG. 13, a piezoelectric element control processing subroutine shown in FIG. 16, and a motor control processing subroutine shown in FIG. 17. The focus controller 21 performs synchronous control of the piezoelectric element 15A and the actuator 15B by synchronizing and executing the focus control preparation processing subroutine, the piezoelectric element control processing subroutine, and the motor control processing subroutine.

In the focus control preparation processing subroutine, a pulse profile for executing motor control is generated and adjusted. In the piezoelectric element control processing subroutine, the piezoelectric element 15A is controlled based on the voltage table (which can fluctuate based on a pulse profile). In the motor control processing subroutine, the pulse motor M that drives the actuator 15B is controlled based on the pulse profile.

First, the focus control preparation processing subroutine of FIG. 13 will be described. For convenience, description will be made using a situation where the observation target region R is located at the I-th region as shown in FIG. 12.

In step S302, the focus controller 21 detects the Z-directional position of the observation scheduled region on the bottom surface of the cultivation container 50 by the first displacement sensor 18a.

Next, in step S304, the focus controller 21 stores the detected information on the Z-directional position in the storage device. As an example, the Z-directional position is stored in a cache memory (not shown) of the CPU 70. Further, the detected Z-directional position may be stored in the primary storage section 72 or the secondary storage section 74.

Next, in step S306, the focus controller 21 derives a distance that is a difference in the Z direction between the focus position (that is, the lower dashed line in FIG. 12) corresponding to the reference plane and the focus position of (I+10)-th region (that is, observation scheduled region).

The calculated distance is recorded in a cache memory (not shown) of the CPU 70 as an example. Further, the distance may be stored in the primary storage section 72 or the secondary storage section 74.

In order to appropriately capture the observation scheduled region, it is necessary to move the imaging optical system 14 by a predetermined distance in the Z direction in a case where the observation target region R moves to the current observation scheduled region. Specifically, the predetermined distance is a value obtained by subtracting the current Z-directional position of the observation target region R from the distance derived in step S306.

Then, in step S308, the focus controller 21 determines whether the distance is smaller than a threshold. As described above, the threshold is, for example, the upper limit of the movable distance of the piezoelectric element 15A.

In a case where the determination in step S308 is positive, the processing of FIG. 13 proceeds to step S310. In step S310, the focus controller 21 sets a flag (turns on the flag) for the observation scheduled region. The flag indicates that the focus position of the observation scheduled region can be reached only by the piezoelectric element 15A. The flag is recorded in a cache memory (not shown) of the CPU 70 as an example.

Next, in step S312, the focus controller 21 determines whether a pulse profile has been created. The details of the pulse profile will be described later.

In a case where a pulse profile exists, the focus controller 21 adjusts the pulse profile in step S314 based on the information on the Z-directional position of the (I+10)-th region stored in step S304. In a case where there is no pulse profile, the processing of step S314 is not executed.

Then, in a case where the observation target region R moves to the adjacent (I+1)-th region by the synchronized stage moving processing, the determination in step S322 is positive, and the processing in FIG. 13 proceeds to step S324. In this case, the observation target region R is positioned in the (I+1)-th region, and the (I+11)-th region is a new observation scheduled region.

In step S324, the focus controller 21 determines whether the new observation scheduled region has reached the scanning end point in the stage moving processing executed by the stage controller 22. The determination in step S324 corresponds to step S210 of the stage moving processing subroutine shown in FIG. 11.

In a case where the determination in step S324 is negative, the processing in FIG. 13 returns to step S302 again, and new processing is started. That is, for the (I+1)-th region where the observation target region R is currently disposed, the (I+11)-th region is set as a new observation scheduled region, and the processing in step S302 and processing subsequent to step S302 are executed. In this way, while the stage controller 22 scans the bottom surface of the cultivation container 50, the focus controller 21 continues the focus control preparation processing.

In a case where the determination in step S308 is negative, in step S316, the focus controller 21 determines whether a pulse profile has been created.

In a case where a pulse profile exists, the focus controller 21 adjusts the pulse profile in step S318 based on the information on the Z-directional position of the (I+10)-th region stored in step S304.

On the other hand, in a case where the pulse profile does not exist, in step S320, the focus controller 21 generates a pulse profile based on the information on the Z-directional position of each of the I-th to (I+10)-th regions stored in the preceding processing and the pulse motor performance value such as the Z-directional moving velocity. The pulse profile is recorded in a cache memory (not shown) of the CPU 70, for example.

Then, in a case where the observation target region R moves to the adjacent (I+1)-th region by the synchronized stage moving processing, the determination in step S322 is positive, and the processing in FIG. 13 proceeds to step S324. Subsequent processing is the same as in a case where the determination in step S308 is positive.

Figures 14, 15:
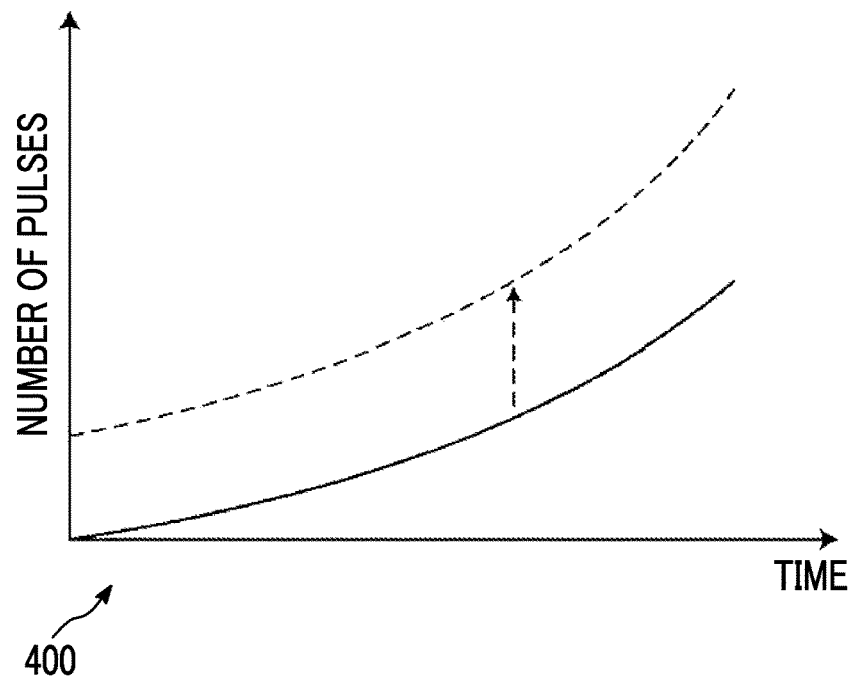
FIG. 14 is a conceptual diagram showing an example of a pulse profile created by executing focus control preparation processing according to the first embodiment.
FIG. 15 is a schematic configuration diagram showing an example of a voltage table according to the first embodiment.

Hereinafter, the pulse profile will be described in detail. FIG. 14 shows an example of the pulse profile 400. The pulse profile represents a functional relationship between the time and the number of pulses per unit time input to the pulse motor M. The pulse profile 400 defines the number of pulses per unit time to be input to the pulse motor M, from the current time (t=0) to the time when it reaches the region ten units ahead in the X-axis scanning direction. The pulse motor M that drives the actuator 15B is controlled based on the pulse profile 400. Specifically, the number of pulses input to the pulse motor M while the observation target region R moves by one unit from the current position to the region in the X-axis scanning direction is determined based on the time required for the observation target region R to move by one unit from the current position to the region in the X-axis scanning direction and the corresponding number of pulses per unit time.

The pulse profile 400 fluctuates every time the observation target region R moves by one unit to the region in the X-axis scanning direction. As an example, the solid curve in FIG. 14 represents the pulse profile 400 in a case where the observation target region R is in the I-th region, and the dashed curve represents the pulse profile 400 in a case where the observation target region R is in the (I+1)-th region.

With the fluctuation of the pulse profile 400, the number of pulses input to the pulse motor M also changes while the observation target region R moves by one unit from the current position to the region in the X-axis scanning direction. As described above, the pulse profile 400 defines the number of pulses per unit time to be input to the pulse motor M to the time when it reaches the region ten units ahead in the X-axis scanning direction. However, it should be noted that the number of pulses actually determined to be input to the pulse motor M is determined only by the number of pulses per unit time corresponding to the time required for the observation target region R to move by one unit from the current position to the region in the X-axis scanning direction.

As described above, the pulse profile 400 is generated based on the information on the Z-directional position of each region from the current position to the region ten units ahead and parameters such as the performance value of the pulse motor, and is adjusted over time.

In the synchronous control of the piezoelectric element 15A and the actuator 15B according to the first embodiment, the actuator 15B is controlled based on the pulse profile 400. On the other hand, the piezoelectric element 15A is controlled based on the voltage table 500.

FIG. 15 shows an example of the voltage table 500. The voltage table 500 includes information on the voltage to be applied to the piezoelectric element 15A with respect to the displacement amount in the Z direction.

As an example, a situation (where the function in FIG. 14 matches the horizontal axis) can be considered in which a pulse profile is not created or the number of pulses is zero at all times in the pulse profile. Each voltage value shown in the voltage table 500 in this situation is called a reference value.

In this case, the actuator 15B is not driven, and the objective lens 14*b* of the imaging optical system 14 is moved in the Z direction only by the piezoelectric element 15A. In a case where the displacement amount to transport the objective lens 14*b* in the Z direction is Z3, the focus controller 21 refers to the voltage table 500 and derives that the voltage value to be applied to the piezoelectric element 15A is V3.

In a case where the objective lens 14*b* of the imaging optical system 14 is moved in the Z direction only by the piezoelectric element 15A, for example, in a case where the observation target region R moves one unit from the current position to the region in the X-axis scanning direction, assuming that the distance in the Z direction between the focus position of the current position (I-th region) and the focus position of the next position ((I+1)-th region) is Z3, the objective lens 14*b* can be adjusted to the focus position in the (I+1)-th region by applying the reference value V3 to the piezoelectric element 15A.

On the other hand, a case can be considered in which the pulse profile 400 exists and the number of pulses per unit time during the time when the observation target region R moves by one unit from the current position to the region in the X-axis scanning direction is not zero. In this case, the actuator 15B is driven, and the objective lens 14*b* of the imaging optical system 14 moves in the Z direction together with the piezoelectric element 15A. In this case, the voltage value of the voltage table 500 is changed based on the pulse profile 400. That is, since the actuator 15B moves in the Z direction based on the pulse profile 400, even though the displacement amount to transport the objective lens 14*b* in the Z direction is Z3, the voltage value to be applied to the piezoelectric element 15A is not the same as V3 that is the previous reference value. By applying the voltage value corresponding to the displacement amount obtained by subtracting the displacement amount by the actuator 15B from Z3 to the piezoelectric element 15A, the objective lens 14*b* of the imaging optical system 14 is transported to the focus position.

Based on the above, processing in FIG. 16 will be described. For convenience, description will be made using a situation where the observation target region R is located at the I-th region as shown in FIG. 12.

In a case where the capturing of the phase difference image in the observation target region R ends, a positive determination is made in step S602, and the processing in FIG. 16 proceeds to step S604.

In step S604, the focus controller 21 acquires the information on the Z-directional position of the (I+10)-th region from the I-th region (that is, the current position of the observation target region R) stored in the preceding focus control preparation processing. As described above, as an example, the information on the Z-directional position is stored in a cache memory (not shown) of the CPU 70.

Next, in step S606, the focus controller 21 determines whether the flag is off for a region ten units ahead in the X-axis scanning direction from the current position of the observation target region R (that is, the observation scheduled region). As described above, the flag is stored in a cache memory (not shown) of the CPU 70 as an example in the preceding focus control preparation processing.

If the determination in step S606 is negative, the focus position of the (I+10)-th region (that is, the observation scheduled region) falls within the drivable range of the piezoelectric element 15A. Next, in step S608, the focus controller 21 determines whether the number of pulses from the current time (t=0) of the pulse profile to the time when the observation target region R has moved by one unit to the region in the X-axis scanning direction is zero. In a case where no pulse profile has been created, the number of pulses is assumed to be zero.

In a case where the determination in step S608 is positive, the focus position of the observation scheduled region falls within the drivable range of the piezoelectric element 15A, and the displacement by the actuator 15B is not performed. In this case, each voltage value of the voltage table 500 shown in FIG. 15 is kept at the reference value.

Then, in a case where the observation target region R reaches the adjacent (I+1)-th region by the synchronized stage moving processing, the determination in step S612 is positive. In this case, since the displacement by the actuator 15B is not performed, in step S614, the focus controller 21 applies the reference value of the voltage table 500 to the piezoelectric element 15A in the (I+1)-th region. As a result, in the (I+1)-th region, the objective lens 14b of the imaging optical system 14 is moved to the focus position by using only the piezoelectric element 15A.

Next, a case can be considered in which the determination in step S606 is negative and the determination in step S608 is negative. In this case, the focus position of the observation scheduled region falls within the drivable range of the piezoelectric element 15A, but the actuator 15B has already been driven.

Therefore, in step S610, the focus controller 21 adjusts the voltage table 500 based on the pulse profile 400. As a result, the voltage table 500 is changed from the reference value.

Then, in a case where the observation target region R reaches the adjacent (I+1)-th region by the synchronized stage moving processing, the determination in step S612 is positive. In this case, in step S614, the focus controller 21 applies a voltage of a value corrected from the reference value of the voltage table 500 to the piezoelectric element 15A in the (I+1)-th region. Further, the actuator 15B is displaced in the Z direction based on the pulse profile by the synchronized motor control processing described later. As a result, the objective lens 14b of the imaging optical system 14 is moved to the focus position in the (I+1)-th region by the displacement of the piezoelectric element 15A and the displacement of the actuator 15B.

Further, a case can be considered in which the determination in step S606 is positive. In this case, the focus position of the observation scheduled region exceeds the drivable range of the piezoelectric element 15A.

In step S610, the focus controller 21 adjusts the voltage table 500 based on the pulse profile 400. Then, the focus controller 21 executes the processing in steps S612 and S614 in the same manner as in a case where the determination in step S606 is negative and the determination in step S608 is negative.

In a case where the processing in step S614 ends, the processing in FIG. 16 proceeds to step S616. In step S616, the focus controller 21 determines whether the observation target region R has reached the scanning end point in the stage moving processing executed by the stage controller 22. The determination in step S616 corresponds to step S210 of the stage moving processing subroutine shown in FIG. 11.

In a case where the determination in step S616 is negative, the processing in FIG. 16 returns to step S602, and the above processing is repeated again. In this way, while the stage controller 22 is executing the stage moving processing, the focus controller 21 continues the processing of applying a voltage to the piezoelectric element based on the voltage table 500.

Next, the motor control processing will be described. FIG. 17 shows a motor control processing subroutine executed by the focus controller 21.

Once the pulse profile is generated in the focus control preparation processing shown in FIG. 13, the motor control processing subroutine is started.

In step S702, the focus controller 21 controls the number of pulses input to the pulse motor M that drives the actuator 15B based on the pulse profile 400. The actuator 15B is displaced in the Z direction based on the number of input pulses. The processing in step S702 is continued until the stage moving processing executed by the stage controller 22 ends.

It should be noted that, in step S702, in a case where the number of pulses at the current time (t=0) of the pulse profile 400 is zero, no pulse is input to the pulse motor M and the actuator 15B is not driven.

In the stage moving processing executed by the stage controller 22, in a case where the observation target region R reaches the scanning end point, the determination in step S704 is positive, and the motor control processing subroutine ends. The determination in step S704 corresponds to the determination in step S210 of the stage moving processing subroutine shown in FIG. 11 and the determination in step S616 of the piezoelectric element control processing subroutine shown in FIG. 16.

As described above, as an example of the focus control using the piezoelectric element 15A and the actuator 15B together, the entire synchronous control of the piezoelectric element 15A and the actuator 15B using the pulse profile 400 and the voltage table 500 has been described. Hereinafter, a typical example of the synchronous control will be described.

As described above, usually, the focus controller 21 executes the focus control processing using only the piezoelectric element 15A.

In this state, in the processing in FIG. 13, the positive determination in step S308, the negative determination in step S312, and the negative determination in step S324 are repeated, and the pulse profile 400 is not generated.

In this case, in the processing in FIG. 16, a negative determination in step S606, and a positive determination in step S608 are repeated. Therefore, in the processing in FIG. 16, each voltage value of the voltage table 500 is not changed from the reference value. That is, in the piezoelectric element control processing in FIG. 16, the focus controller 21 repeatedly applies the voltage of the reference value to the piezoelectric element 15A.

On the other hand, since the pulse profile 400 is not generated in the processing in FIG. 13, the motor control processing in FIG. 17 is not started.

In this way, the focus control processing is performed only by the piezoelectric element 15A.

Next, it is assumed that the focus position of the observation scheduled region exceeds the drivable range of the piezoelectric element 15A at a certain time point in the stage moving processing executed by the stage controller 22. In this case, in the processing in FIG. 13, a negative determination is made in step S308 and a negative determination is made in step S316, and the pulse profile 400 is generated in step S320.

In a case where the pulse profile 400 is generated, the motor control processing in FIG. 17 is started, and the focus control processing in which the piezoelectric element 15A and the actuator 15B are synchronized is executed.

In this process, the pulse profile fluctuates with time in step S314 or step S318 in FIG. 13. On the other hand, in step S610 of FIG. 16, each voltage value of the voltage table 500 fluctuates from the reference value and changes with time.

In this manner, the focus control processing using both the piezoelectric element 15A and the actuator 15B is performed.

Next, it is assumed that the stage moving processing has progressed and the bottom surface of the cultivation container 50 has passed a region having large variations. In this case, a positive determination is made in step S308 and a positive determination is made in step S312 in FIG. 13, and it is considered that the pulse profile is adjusted to a value close to zero in step S314.

In a case where the number of pulses becomes zero at all times in the pulse profile (in a case where the function in FIG. 14 matches the horizontal axis), no pulse is input to the pulse motor M in S702 in FIG. 17, and the actuator 15B stops. On the other hand, a negative determination is made in step S606 and a positive determination is made in step S608 in FIG. 16, and each voltage value in the voltage table 500 does not fluctuate from the reference value.

The return to the normal state is performed in this way, and the focus control processing using only the piezoelectric element 15A is executed again.

As described above, the control using the pulse profile 400 and the voltage table 500 has been described as an example of the focus control for synchronously controlling the piezoelectric element 15A and the actuator 15B. However, the focus control for synchronously controlling the piezoelectric element 15A and the actuator 15B is not limited to the control using the pulse profile 400 and the voltage table 500. By applying various known optimization technologies, it is possible to appropriately control the piezoelectric element 15A and the actuator 15B and execute the focus control of the first embodiment.

In the first embodiment, since the Z-directional position of the cultivation container 50 is detected in advance for each observation target region R as described above, the timing at which the position of the cultivation container 50 in each observation target region R is detected and the timing at which the phase difference image is captured are temporally shifted. Therefore, the movement of the imaging optical system 14 (the objective lens 14b) in the Z direction, that is, the auto-focus control is performed after the position of the cultivation container 50 is detected by the first displacement sensor 18a or the second displacement sensor 18b and before the observation target region R reaches the detection position.

Here, in a case where the timing of the auto-focus control is too early, the Z-directional position of the cultivation container 50 may be shifted, and the focus position may be shifted after the auto-focus control and before the observation target region R reaches the detection position for some reason.

Therefore, it is desirable that the timing of the auto-focus control is a timing immediately before the observation target region R reaches the detection position and a timing at which the phase difference image is captured in the detection position in time. For example, as shown in FIG. 9, in a case where the observation target region R sequentially moves in the X direction and the detection position by the detection section 18 is the position of Pd indicated by oblique lines, it is desirable that the time immediately before the observation target region R reaches the detection position is a period from the time when the observation target region R passes the position Pr of the observation target region R adjacent to the detection position Pd to when the observation target region R reaches the detection position Pd. The auto-focus control may be performed when the observation target region R reaches the detection position Pd.

In the first embodiment, the time from the timing of detection by the first displacement sensor 18a or second displacement sensor 18b to the timing of auto-focus control using the position information of the detection position is preset so that the timing of the auto-focus control is the desired timing as described above.

In a case where the moving velocity of the stage 51 is changed by, for example, changing the magnification of the phase difference lens 14a, the above-described preset time may be changed according to the change in the moving velocity of the stage 51. Alternatively, in a case where the moving velocity of the stage 51 is changed instead of changing the preset time described above, the distance between the first displacement sensor 18a or the second displacement sensor 18b and the imaging optical system 14 may be changed by moving the first displacement sensor 18a or the second displacement sensor 18b in the X direction.

[Processing after Scanning Processing]

When the scanning processing in step S100 shown in FIG. 10 ends, the narrow view image in the focus state is generated for each region on the bottom surface of the cultivation container 50, and stored in the primary storage section 72, the cache memory (not shown) of the CPU 70, or the secondary storage section 74.

The processing shown in FIG. 10 proceeds to step S102.

In step S102, the CPU 70 of the microscope control device 20 reads out and combines the stored narrow view images to generate one composite phase difference image (that is, a wide view image) showing the entire bottom surface of the cultivation container 50.

Next, in step S104, the CPU 70 of the microscope control device 20 stores the generated composite phase difference image, and ends the wide view image acquisition processing. The generated composite phase difference image can be stored in, for example, the secondary storage section 74.

Note that, the stored wide view image can be displayed on the display device 30.

According to the first embodiment, it is possible to cause the focus control to follow the position of each region in the optical axis direction according to a scanning situation.

Specifically, by synchronously controlling the piezoelectric element and the actuator in the Z direction connected to the pulse motor, even in a case where there are large variations on the bottom surface of the cultivation container, the auto-focus control can be performed appropriately during high-speed scanning of the entire bottom surface of the cultivation container. The focus control for each region can be speeded up according to the position of each region on the bottom surface of the cultivation container in the optical direction, and as a result, the scanning time of the entire bottom surface of the cultivation container can be reduced.

Second Embodiment

Next, a microscope apparatus according to a second embodiment of the technology of the present disclosure will be described in detail with reference to the drawings. The microscope apparatus according to the second embodiment differs from the microscope apparatus according to the first embodiment in the configuration of the detection section. Since the other configuration of the microscope apparatus of the second embodiment is the same as that of the first embodiment, the following description will be given focusing on the configuration of the detection section of the microscope apparatus of the second embodiment.

The detection section 18 of the first embodiment comprises two displacement sensors 18a and 18b, and switches the displacement sensor to be used according to the change of the observation target region R in the X-axis scanning direction. On the other hand, a detection section 19 of the second embodiment includes one displacement sensor, and switches the position of the displacement sensor according to the change of the observation target region R in the X-axis scanning direction.

Figure 19:
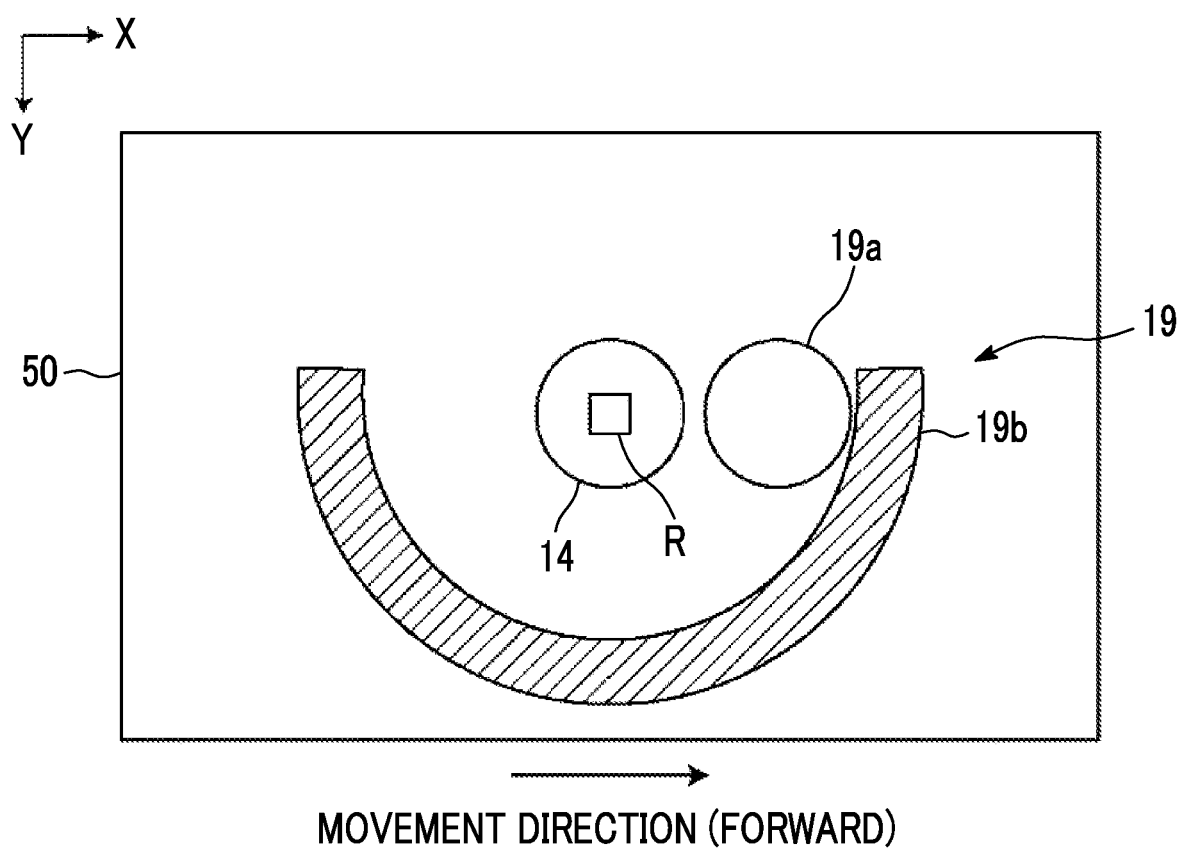
FIG. 19 is a schematic configuration diagram showing an example of a configuration of a detection section included in the microscope apparatus according to the second embodiment.
Figure 20:
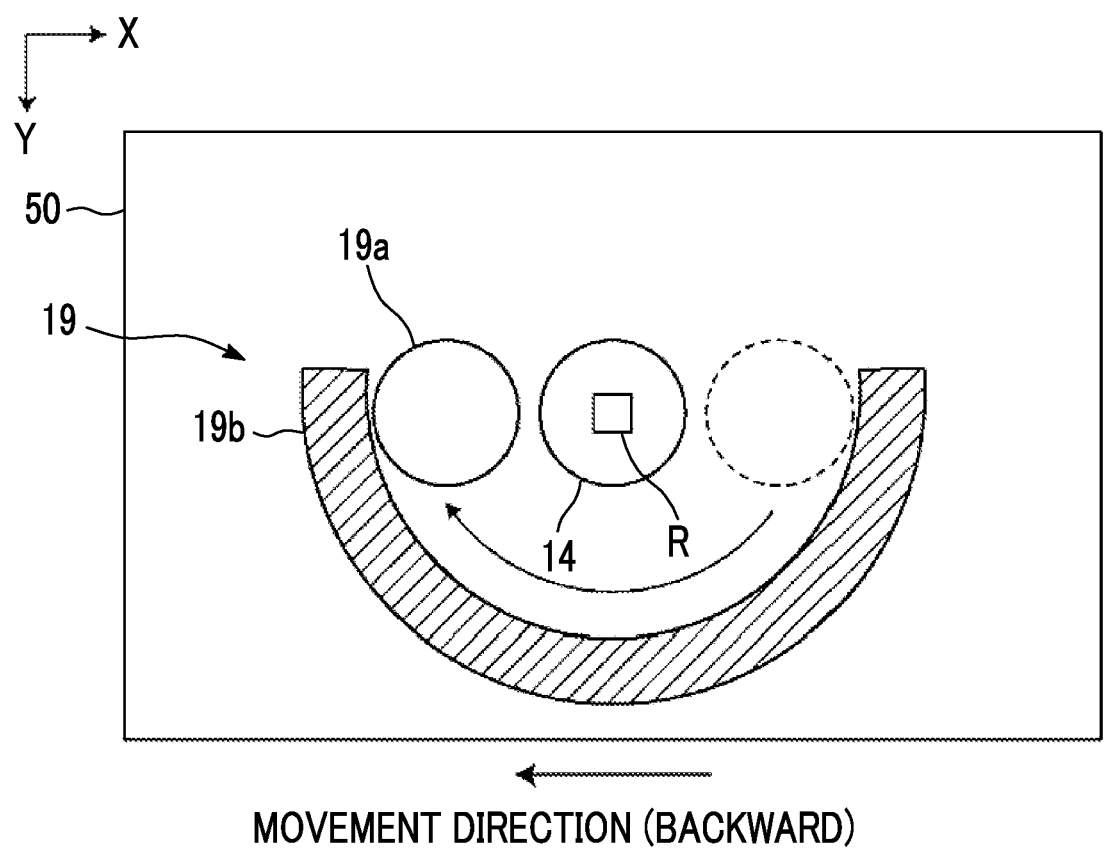
FIG. 20 is a diagram provided to explain switching of a position of a displacement sensor in a detection section included in the microscope apparatus according to the second embodiment.

FIGS. 19 and 20 are diagrams showing a specific configuration of the detection section 19 of the second embodiment. As shown in FIGS. 19 and 20, the detection section 19 comprises a displacement sensor 19a and a guide mechanism 19b that guides the displacement sensor 19a to move the position of the displacement sensor 19a.

The displacement sensor 19a is the same as the first and second displacement sensors 18a and 18b of the first embodiment. That is, the displacement sensor 19a is configured of a laser displacement sensor.

The guide mechanism 19b comprises a semicircular arc-shaped guide member, so that the displacement sensor 19a is moved along the guide member. The guide member moves the displacement sensor 19a from one side to the other side in the X direction with the imaging optical system 14 (objective lens 14b) being interposed therebetween.

FIG. 19 is a diagram showing a position of the displacement sensor 19a in a case where the X-axis scanning direction of the observation target region R is an arrow direction in FIG. 19 (rightward in FIG. 19). On the other hand, FIG. 20 is a diagram showing a position of the displacement sensor 19a in a case where the X-axis scanning direction of the observation target region R is an arrow direction in FIG. 20 (leftward in FIG. 20). In a case where the X-axis scanning direction of the observation target region R is changed to the arrow direction in FIG. 20 from the arrow direction in FIG. 19, the displacement sensor 19a is moved from the position shown in FIG. 19 along the guide member of the guide mechanism 19b, and is switched to the position shown in FIG. 20.

In the second embodiment, the above-described guide mechanism 19b is provided as a displacement sensor moving mechanism for moving the position of the displacement sensor, but the configuration of the displacement sensor moving mechanism is not limited thereto, and other configurations may be used as long as the position of the displacement sensor is capable of being similarly changed.

The other configurations and operations of the microscope apparatus of the second embodiment are the same as in the microscope apparatus of the first embodiment.

MODIFICATION EXAMPLE

Hereinafter, a modification example of the present disclosure will be described. Hereinafter, the present modification example will be described based on the first embodiment, but the present modification example can also be applied to the second embodiment.

Figure 21:
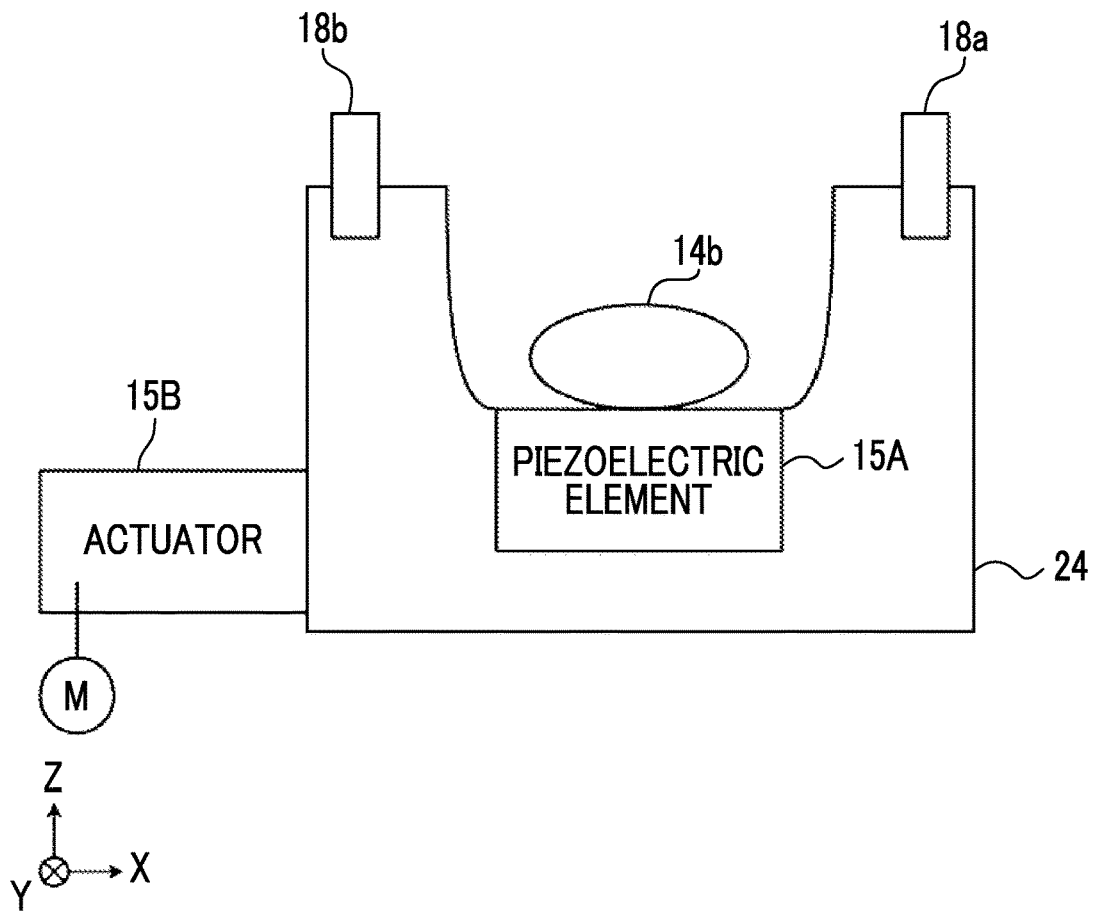
FIG. 21 is a schematic configuration diagram showing a modification example of a configuration of an imaging optical system driving section according to the first embodiment.

FIG. 21 shows an example in which a modification example is applied to an imaging optical system driving section 15 including a piezoelectric element 15A and an actuator 15B.

In the imaging optical system driving section 15 of the first embodiment shown in FIG. 3, the piezoelectric element 15A is disposed on the actuator 15B.

In the modification example of FIG. 21, the piezoelectric element 15A is held by the holding member 24. Further, the actuator 15B is disposed on a side surface of the holding member 24. In the present modification example, the actuator 15B transmits power for moving the holding member 24 in the Z direction to the holding member 24 via the side surface of the holding member 24. The objective lens 14b of the imaging optical system 14 to be held by the piezoelectric element 15A held by the holding member 24 moves in the Z direction by the holding member 24 moving in the Z direction by the actuator 15B.

The positional relationship between the piezoelectric element 15A and the actuator 15B is not limited to the modification example shown in FIG. 21. It is sufficient as long as the objective lens 14b can be appropriately transported in the Z direction.

In the first and second embodiments, a configuration in which the observation target region R is scanned by moving the stage 51 is shown, but the disclosure is not limited thereto. For example, a configuration in which the stage 51 is fixed and the observation target region R is scanned by moving the imaging optical system 14 and a different configuration relating to the capturing of a phase difference image may be used. A configuration in which the observation target region R is scanned by moving all of the stage 51 and the imaging optical system 14 and the other configuration relating to the capturing of the different phase difference image may be used.

Further, in the first and second embodiments, the disclosure is applied to a phase contrast microscope, but the disclosure is not limited to the phase contrast microscope, and may be applied to a different microscope such as a differential interference microscope or a bright field microscope.

In addition, in the first and second embodiments, a configuration in which a phase difference image formed by the imaging optical system 14 is captured by the imaging element 16 is shown, but a configuration in which an imaging element is not provided and an observation optical system or the like is provided so that a user is able to directly observe a phase difference image of an observation target formed by the imaging optical system 14 may be used.

Figure 22:
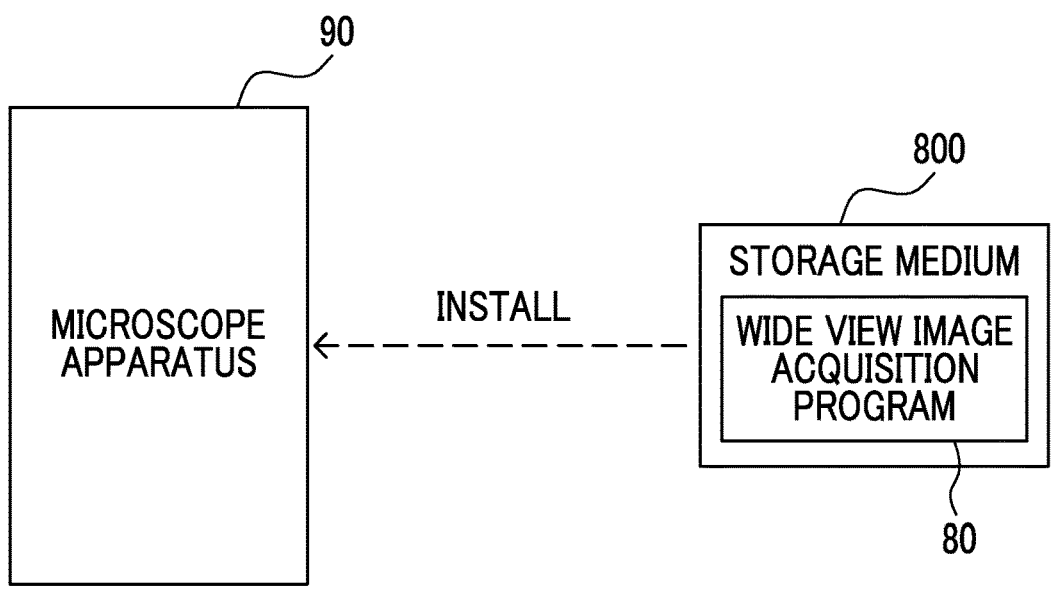
FIG. 22 is a conceptual diagram showing an example of a mode in which a wide view image acquisition program is installed in a microscope apparatus from a storage medium storing a wide view image acquisition program according to the first and second embodiments.

Further, in the first and second embodiments, a configuration in which the wide view image acquisition program 80 is read out from the secondary storage section 74 has been described as an example. However, it is not always necessary to store the program in the secondary storage section 74 from the beginning. For example, as shown in FIG. 22, the wide view image acquisition program 80 may first be stored in any portable storage medium 800 such as a Solid State Drive (SSD), a Universal Serial Bus (USB) memory, or a Digital Versatile Disc-Read Only Memory (DVD-ROM). In this case, the wide view image acquisition program 80 in the storage medium 800 is installed in the microscope apparatus 90, and the installed wide view image acquisition program 80 is executed by the CPU 70.

The wide view image acquisition program 80 may be stored in a storage section such as another computer or a server connected to the microscope apparatus 90 via a communication network (not shown), and the wide view image acquisition program 80 may be downloaded in response to a request from the microscope apparatus 90. In this case, the downloaded wide view image acquisition program 80 is executed by the CPU 70.

The wide view image acquisition processing described in the first and second embodiments is merely an example. Therefore, needless to say, unnecessary steps may be deleted, new steps may be added, or the processing order may be changed without departing from the scope of the invention.

In the first and second embodiments, a configuration in which wide view image acquisition processing is realized by the software configuration using a computer has been described as an example. However, the technology of the present disclosure is not limited to this. For example, the wide view image acquisition processing may be executed only by a hardware configuration such as a Field-Programmable Gate Array (FPGA) or an Application Specific Integrated Circuit (ASIC) instead of a software configuration using a computer. The wide view image acquisition processing may be executed by a configuration in which a software configuration and a hardware configuration are combined.

EXPLANATION OF REFERENCES

10: microscope apparatus main body
11: white light source
12: condenser lens
13: slit plate
14: imaging optical system
14a: phase difference lens
14b: objective lens
14c: phase plate
14d: imaging lens
15: imaging optical system driving section
15A: piezoelectric element
15B: actuator
16: imaging element
17: stage driving device
18: detection section
18a: displacement sensor
18b: displacement sensor
19: detection section
19a: displacement sensor
19b: guide mechanism
20: microscope control device
21: focus controller
22: stage controller
24: holding member
30: display device
40: input device
50: cultivation container
5: stage
51a: opening
72: primary storage section
74: secondary storage section
80: wide view image acquisition program
90: microscope apparatus
400: pulse profile
500: voltage table
800: storage medium
E: X-axis scanning end point
L: illumination light
M: pulse motor
Pd: detection position
Pr: position
R1: range
R2: range
R: observation target region
S: scanning start point
W: well

What is claimed is:

1. A microscope apparatus comprising:
a processor;
a focusing device capable of forming an image of observation target light indicating an observation target in a container in which the observation target is contained, on an imaging element, including an objective lens, a phase plate and an imaging lens;
a drive source that includes a first moving member movable for moving the objective lens along an optical axis of the focusing device, and a second moving member movable along the optical axis in a range wider than that of the first moving member and moves the objective lens along the optical axis using the first moving member and the second moving member; and
a displacement sensor that is provided along the optical axis and detects a position of an observation scheduled region along the optical axis and is positioned forward in a scanning direction relative to the optical axis of the focusing device and imaging element,
wherein the processor configured to
control the drive source to cause the imaging element to form the image of the observation target light in a focus state when the optical axis of the focusing device and imaging element reaches the observation scheduled region, by moving the focusing device along the optical axis by using the first moving member and the second moving member based on information on a distance along the optical axis between the observation scheduled region and a region to be imaged by the imaging element at an imaging position, in a case where it is determined that the observation scheduled region exists at a position of an out-of-focus state in a state where the first moving member is moved to a limit of a movable range of the first moving member before the optical axis reaches the observation scheduled region among respective regions, in a state where the imaging element scans the respective regions in the container by moving the focusing device with respect to the respective regions in the container by a movement of at least one of a stage on which the container is installed or the focusing device in a plane intersecting the optical axis; and
control the drive source to cause the imaging element to form the image of the observation target light in the focus state when the optical axis reaches the observation scheduled region by applying power along the optical axis by the first moving member and the second moving member to the focusing device based on the information on the distance, in a case where a position detected by the displacement sensor is the position of the out-of-focus state in a state where the first moving member is moved to the limit of the movable range, before the optical axis reaches the observation scheduled region among the respective regions in a state where the imaging element scans the respective regions in the container.

2. The microscope apparatus according to claim 1, wherein an amount of power supplied for drive source in the optical axis distributed by the first moving member and the second moving member is determined in accordance with a relationship between the information on the distance, information on a position of the second moving member in the optical axis before the observation scheduled region is scanned, and information on a moving amount of the first moving member.

3. The microscope apparatus according to claim 1, wherein the processor is further configured to control the drive source to cause the imaging element to form the image of the observation target light in the focus state when the optical axis reaches the observation scheduled region by applying power in the optical axis by only the first moving member out of the first moving member and the second moving member to the focusing device based on the information on the distance, in a case where it is determined that the observation scheduled region exists at a position of the focus state in a state where the first moving member is moved below the upper limit of the movable range, before the optical axis reaches the observation scheduled region among the respective regions in a state where the imaging element scans the respective regions in the container.

4. The microscope apparatus according to claim 3, wherein the power in the optical axis by only the first moving member out of the first moving member and the second moving member is determined in accordance with a relationship between the information on the distance and information on a moving amount of the first moving member.

5. The microscope apparatus according to claim 1, wherein the first moving member is a piezoelectric element that deforms along the optical axis of the focusing device.

6. The microscope apparatus according to claim 1, wherein the drive source includes a pulse motor, and the second moving member moves in the optical axis by receiving power from the pulse motor.

7. The microscope apparatus according to claim 1, wherein the displacement sensor includes a pair of sensors that are provided side by side with the focusing device interposed therebetween in a main scanning direction with respect to the respective regions, and that detect the position of the observation scheduled region in the optical axis respectively, and the processor is further configured to control the drive source to cause the imaging element to form the image of the observation target light in the focus state when the optical axis reaches the observation scheduled region by applying the power in the optical axis by the first moving member and the second moving member to the focusing device based on the information on the distance, in a case where a position detected by a sensor of the pair of sensors that reaches the observation scheduled region in the main scanning direction earlier is the position of the out-of-focus state in a state where the first moving member is moved to the limit of the movable range, before the optical axis reaches the observation scheduled region among the respective regions in a state where the imaging element scans the respective regions in the container.

8. The microscope apparatus according to claim 1, further comprising:
a holding member that holds the drive source,
wherein the displacement sensor is held by the holding member.

9. The microscope apparatus according to claim 1, wherein the focusing device has the objective lens movable in the optical axis, and
the objective lens is moved in the optical axis by the first moving member and the second moving member.

10. The microscope apparatus according to claim 1, wherein the container is a well plate having a plurality of wells.

11. A non-transitory computer readable recording medium storing a program causing a computer to function as the processor included in the microscope apparatus according to claim 1.

* * * * *